US011809678B2

(12) United States Patent
Ens et al.

(10) Patent No.: US 11,809,678 B2
(45) Date of Patent: *Nov. 7, 2023

(54) THREE DIMENSIONAL VISUAL PROGRAMMING INTERFACE FOR A NETWORK OF DEVICES

(71) Applicant: AUTODESK, INC., San Francisco, CA (US)

(72) Inventors: Barrett Ens, Manitoba (CA); Fraser Anderson, Camrose (CA); George Fitzmaurice, Toronto (CA); Tovi Grossman, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/717,876

(22) Filed: Sep. 27, 2017

(65) Prior Publication Data

US 2018/0018076 A1    Jan. 18, 2018

Related U.S. Application Data

(63) Continuation of application No. 15/636,517, filed on Jun. 28, 2017.

(Continued)

(51) Int. Cl.
*G06F 3/0481*    (2013.01)
*H04L 12/24*    (2006.01)
(Continued)

(52) U.S. Cl.
CPC .......... *G06F 3/04815* (2013.01); *G06F 3/011* (2013.01); *H04L 41/22* (2013.01)

(58) Field of Classification Search
CPC ....... G06F 3/04815; G06F 3/011; H04L 41/22
(Continued)

(56) References Cited

U.S. PATENT DOCUMENTS 5,517,663 A    5/1996 Kahn
5,758,122 A    5/1998 Corda et al.
(Continued)

FOREIGN PATENT DOCUMENTS

| CA | 2806800 A1 | * | 8/2013 | ............ H04W 4/206 |
|----|------------|---|--------|------------------------|
| EP | 2632133 A1 | * | 8/2013 | ........ H04M 1/72427 |
| GB | 2534375 A  | * | 7/2016 | ............. G06N 7/005 |

OTHER PUBLICATIONS

Serma, M. et al., "A Visual Programming Framework for Wireless Sensor Networks in Smart Home Applications," (c) Apr. 7, 2015, CISTER, 8 pages.

(Continued)

*Primary Examiner* — Chau T Nguyen
(74) *Attorney, Agent, or Firm* — Artegis Law Group, LLP

(57) ABSTRACT

Approaches for generating virtual representations of smart objects in a 3D visual programming interface. The interface displays a 3D virtual environment containing virtual objects that represents a real-world environment containing smart objects. The 3D virtual environment displays virtual objects in a manner that is spatially accurate relative to the physical objects in the real-world environment. For each virtual object representing a physical object, a logic node (port node) is displayed, the port node representing the set of functions associated with the physical object. The interface enables users to create, delete, or modify different types of logic nodes (representing functions) and create, delete, or modify links (representing data connections) between logic nodes within the 3D virtual environment. The authoring of the logic nodes and links produces an executable program. Upon executing the program, data flows between the logic nodes are visually represented as particles moving between the logic nodes.

15 Claims, 11 Drawing Sheets

Related U.S. Application Data

(60) Provisional application No. 62/357,856, filed on Jul. 1, 2016.

(51) Int. Cl.
*G06F 3/01* (2006.01)
*G06F 3/04815* (2022.01)
*H04L 41/22* (2022.01)

(58) Field of Classification Search
USPC ........................................................ 715/735
See application file for complete search history.

(56) References Cited

U.S. PATENT DOCUMENTS

| | | | | |
|---|---|---|---|---|
| 5,808,612 | A * | 9/1998 | Merrick | G06F 3/0481 715/775 |
| 5,894,309 | A * | 4/1999 | Freeman | G06T 15/50 345/426 |
| 6,175,954 | B1 | 1/2001 | Nelson et al. | |
| 6,427,142 | B1 * | 7/2002 | Zachary | G06F 8/34 706/45 |
| 6,792,323 | B2 | 9/2004 | Kryzanowski et al. | |
| 6,944,584 | B1 | 9/2005 | Tenney et al. | |
| 7,051,309 | B1 * | 5/2006 | Crosetto | G06F 9/3867 712/E9.062 |
| 8,042,049 | B2 | 10/2011 | Killian et al. | |
| 8,291,408 | B1 | 10/2012 | Czymontek | |
| 9,117,039 | B1 | 8/2015 | Mosterman et al. | |
| 9,245,068 | B1 | 1/2016 | Mosterman et al. | |
| 9,582,933 | B1 * | 2/2017 | Mosterman | G06K 9/2081 |
| 9,607,113 | B1 | 3/2017 | Ciolfi et al. | |
| 10,001,976 | B2 | 6/2018 | Sarkar et al. | |
| 10,338,895 | B2 | 7/2019 | Zhang et al. | |
| 10,360,052 | B1 | 7/2019 | Zander et al. | |
| 10,620,917 | B2 | 4/2020 | McDaniel | |
| 2002/0147963 | A1 | 10/2002 | Lee | |
| 2002/0167725 | A1 * | 11/2002 | Goto | G03B 21/625 359/456 |
| 2004/0031019 | A1 * | 2/2004 | Lamanna | G06F 11/3664 717/125 |
| 2004/0207659 | A1 | 10/2004 | Goodman et al. | |
| 2005/0086612 | A1 * | 4/2005 | Gettman | G06F 3/04815 715/848 |
| 2005/0229154 | A1 | 10/2005 | Hiew et al. | |
| 2007/0055976 | A1 | 3/2007 | Ward et al. | |
| 2007/0139419 | A1 * | 6/2007 | Azuma | A63F 13/10 345/474 |
| 2007/0192727 | A1 * | 8/2007 | Finley | G06F 3/04815 715/781 |
| 2008/0127063 | A1 | 5/2008 | Silva et al. | |
| 2011/0267358 | A1 * | 11/2011 | Rennuit | G06T 13/40 345/474 |
| 2013/0222266 | A1 * | 8/2013 | Gardenfors | H04M 1/72412 345/173 |
| 2013/0222405 | A1 * | 8/2013 | Ademar | G06F 3/1423 345/581 |
| 2013/0222433 | A1 * | 8/2013 | Chapman | G06T 13/40 345/660 |
| 2013/0226444 | A1 * | 8/2013 | Johansson | G06F 3/0488 701/300 |
| 2014/0181704 | A1 | 6/2014 | Madonna et al. | |
| 2015/0130689 | A1 * | 5/2015 | Sugden | G02B 27/017 345/8 |
| 2015/0222618 | A1 * | 8/2015 | Pastor | H04L 63/10 726/4 |
| 2016/0087933 | A1 | 3/2016 | Johnson et al. | |
| 2016/0210080 | A1 * | 7/2016 | Frank | G06F 3/0613 |
| 2016/0218884 | A1 | 7/2016 | Ebrom et al. | |
| 2016/0314609 | A1 * | 10/2016 | Taylor | G06T 13/40 |
| 2016/0357521 | A1 | 12/2016 | Zhang et al. | |
| 2016/0357522 | A1 | 12/2016 | Wee et al. | |
| 2016/0357523 | A1 | 12/2016 | Zhang et al. | |
| 2016/0357524 | A1 | 12/2016 | Vialuf et al. | |
| 2016/0357525 | A1 * | 12/2016 | Wee | G06F 9/455 |
| 2016/0359664 | A1 * | 12/2016 | Malegaonkar | G06F 8/34 |
| 2017/0169613 | A1 * | 6/2017 | VanBlon | G06F 3/165 |
| 2017/0185383 | A1 | 6/2017 | Sarkar et al. | |
| 2017/0249129 | A1 * | 8/2017 | McDaniel | G06F 8/35 |
| 2017/0255450 | A1 * | 9/2017 | Mullins | G06F 8/315 |
| 2018/0126099 | A1 * | 5/2018 | Verjus | G01F 25/0007 |

OTHER PUBLICATIONS

Jeong, Y. et al., "AVIot: Web-based Interactive Authoring and Visualization of Indoor Internet of Things," (C) Sep. 29, 2015, IEEE, pp. 295-301.

Mainetti, L. et al., "A Novel Architecture Enabling the Visual Implementation of Web of Things Applications," (c) Sep. 2013, IEEE, 7 pages.

Heun, V.M.J., "Smarter Objects: Programming Physical Objects with AR Technology," (C) 2013, 122 pages.

DiVerdi, S. et al., "A Framework for Generic Inter-Application Interaction for 3D AR Environments," (c) 2003, pp. 86-93.

Non-Final Office Action received for U.S. Appl. No. 15/636,517, dated Dec. 16, 2019, 14 pages.

Bau et al., "OctoPocus: A Dynamic Guide for Learning Gesture-Based Command Sets", In Proc. UIST'08, ACM, Oct. 19-22, 2008, pp. 37-46.

Blackstock et al., "IoT Mashups with the WoTKit", 2012 3rd International Conference on the Internet of Things, IEEE, http://ieeexplore.ieee.org/xpls/abs_all.jsp?arnumber=6402318, pp. 159-166.

Blackstock et al., Toward a Distributed Data Flow Platform for the Web of Things (distributed node-RED). In WoT 14, Proceedings of the 5th International Workshop on Web of Things IEEE, https://doi.org/10.1145/2684432.2684439, pp. 34-39.

Blackwell et al., "Cognitive Factors in Programming with Diagrams" Artificial Intelligence Review vol. 15, No. 1, pp. 95-114.

Cooper et al., "Alice: a 3-D tool for Introductory Programming Concepts", Journal of Computing Sciences in Colleges, Consortium for Computing Sciences in Colleges, http://dl.acm.org/citation.cfm?id=364161, vol. 15 Issue 5, May 2000, 107-116. pp. 107-116.

Deering, M.F., "The HoloSketch VR sketching system", Communications of the ACM, vol. 39, Issue 5,May 1996, pp. 54-61.

Dey et al., 2001. "A Conceptual Framework and a Toolkit for Supporting the Rapid Prototyping of Context-aware Applications", Human-Computer Interaction, http://doi.org/10.1207/S15327051HCI16234_02, vol. 16, No. 2001, 2, pp. 97-166.

Dey et al., "iCAP: Interactive Prototyping of Context-Aware Applications", In Pervasive Computing, Kenneth P. Fishkin, Bernt Schiele, Paddy Nixon and Aaron Quigley (eds.). Springer Berlin Heidelberg, http://link.springer.com/chapter/10.1007/11748625_16, 2006, pp. 254-271.

Elsayed et al., "Situated Analytics", Big Data Visual Analytics (BDVA), IEEE, 1-8, http://ieeexplore.ieee.org/xpls/abs_all.jsp?arnumber=7314302, Sep. 22-25, 2015, pp. 1-8.

Glueck et al., "Dive in!: Enabling Progressive Loading for Real-time Navigation of Data Visualizations", Proceedings of the SIGCHI Conference on Human Factors in Computing Systems (CHI '14), ACM, http://doi.org/10.1145/2556288.2557195,Apr. 26-May 1, 2014, pp. 561-570.

Greenberg et al., 2001."Phidgets: Easy Development of Physical Interfaces through Physical Widgets". UIST '01: Proceedings of the 14th annual ACM symposium on User interface software and technology, pp. 209-218.

Gunnarsson et al., "Visualization of Sensor Data Using Mobile Phone Augmented Reality" Proceedings of the 5th IEEE and ACM International Symposium on Mixed and Augmented Reality, IEEE Computer Society, http://dl.acm.org/citation.cfm?id=1514242, Oct. 22-25, 2006, pp. 233-234.

Güven et al, 2006. "Mobile augmented reality interaction techniques for authoring situated media on-site", ISMAR '06: Proceedings of the 5th IEEE and ACM International Symposium on Mixed and Augmented Reality, IEEE Computer Society, 235-236. http://dl.acm.org/citation.cfm?id=1514243, pp. 235-236.

(56) References Cited

OTHER PUBLICATIONS

Herrera-Acuña et al., "Toward a 3D hand gesture Multi-Threaded Programming Environment", In Advances in Visual Informatics. Springer, http://link.springer.com/chapter/10.1007/978-3-319-02958-0_1, 2013, pp. 1-12.
Heun et al., "Reality Editor: Programming Smarter Objects", UbiComp '13 Adjunct: Proceedings of the 2013 ACM conference on Pervasive and ubiquitous computing adjunct publication, ACM, http://doi.org/10.1145/2494091.2494185, Sep. 2013, 307-310.
Humble et al., "Playing with the Bits" User-Configuration of Ubiquitous Domestic Environments, In UbiComp 2003: Ubiquitous Computing, Anind K. Dey, Albrecht Schmidt and Joseph F. McCarthy (eds.). Springer Berlin Heidelberg, http://link.springer.com/chapter/10.1007/978-3-540-39653-6_20, 2003, pp. 256-263.
Kawsar et al., 2010. "An explorative comparison of magic lens and personal projection for interacting with smart objects", In MobileHCI '10: Proceedings of the 12th international conference on Human computer interaction with mobile devices and services, http://doi.org/10.1145/1851600.1851627, Sep. 2010, pp. 157-160.
Keefe et al., "CavePainting: A Fully Immersive 3D Artistic Medium and Interactive Experience", I3D '01: Proceedings of the 2001 symposium on Interactive 3D graphics, ACM, https://doi.org/10.1145/364338.364370, Mar. 2001, pp. 35-93.
Khan et al., "Big Data from the Built Environment", LARGE '11: Proceedings of the 2nd international workshop on Research in the large, ACM, http://doi.org/10.1145/2025528.2025537, Sep. 17-21, 2011, pp. 29-32.
Lee et al., "A Tangible Programming Tool for Creation of Context-aware Applications", UbiComp '13: Proceedings of the 2013 ACM international joint conference on Pervasive and ubiquitous computing, ACM, http://doi.org/10.1145/2493432.2493483, Sep. 8-12, 2013, pp. 391-400.
Mayer et al., 2014. "A magic lens for revealing device interactions in smart environments", SA '14: SIGGRAPH Asia 2014 Mobile Graphics and Interactive Applications, http://doi.org/10.1145/2669062.2669077, Nov. 2014, Article No. 9, pp. 1-6.
Mine, Mark R., "Working in a virtual world: Interaction techniques used in the chapel hill immersive modeling program", University of North Carolina. https://www.researchgate.net/profile/Mark_Mine/publication/2815077_Working_in_a_Virtual_World_Interaction_Techniques_Used_in_the_Chapel_Hill_Immersive_Modeling_Program/links/00b4951c693245cca1000000.pdf, Sep. 1996, 15 pages.
Najork et al.,"The CUBE languages", Visual Languages, 1991., in Proceedings 1991 IEEE Workshop on Visual Languages, pp. 218-224.
Ni et al., "Increased Display Size and Resolution Improve Task Performance in Information-Rich Virtual Environments", PGI '06: Proceedings of Graphics Interface 2006, Canadian Information Processing Society, http://dl.acm.org/citation.cfm?id=1143079.1143102, Jun. 2006, pp. 139-146.
Reeth et al., "Realizing 3D Visual Programming Environments within a Virtual Environment", Computer Graphics Forum, Wiley Online Library, http://onlinelibrary.wiley.com/doi/10.1111/j.1467-8659.1995.cgf143_0361.x/abstract, Aug. 1995, pp. 361-370.
Resnick et al., "Scratch: Programming for All", Communications of the ACM, vol. 52 No. 11 pp. 60-67.
Robertson et al., "Data Mountain: Using Spatial Memory for Document Management", UIST '98: Proceedings of the 11th annual ACM symposium on User interface software and technology, ACM, https://doi.org/10.1145/288392.288596, Nov. 1998, pp. 153-162.
Salber et al., "The Context Toolkit: Aiding the Development of Context-Enabled Applications", CHI '99: Proceedings of the SIGCHI conference on Human Factors in Computing Systems, ACM, http://doi.org/10.1145/302979.303126, May 1999, pp. 434-441.
Schulze et al., "CaveCAD: A Tool for Architectural Design in Immersive Virtual Environments", Proceedings vol. 9012, The Engineering Reality of Virtual Reality 2014; 901208 (2014), http://proceedings.spiedigitallibrary.org/proceeding.aspx?articleid=1839985, Feb. 28, 2014, 10 pages.
Shi et al., "Digital Campus Innovation Project: Integration of Building Information Modelling with Building Performance Simulation and Building Diagnostics", SimAUD '15: Proceedings of the Symposium on Simulation for Architecture & Urban Design, http://dl.acm.org/citation.cfm?id=2873021.2873029, Apr. 2015, pp. 51-58.
Walsh et al., "Visualising environmental corrosion in outdoor augmented reality", AUIC '11: Proceedings of the Twelfth Australasian User Interface Conference—vol. 117, Australian Computer Society, Inc., http://dl.acm.org/citation.cfm?id=2460621, Jan. 2011 pp. 39-46.
Ware et al., "Using the bat: a six-dimensional mouse for object placement" IEEE Computer Graphics and Applications, http://doi.org/10.1109/38.20319 vol. 8, Issue 6, Nov. 1988, pp. 65-70.
Weiser, Mark, "The Computer for the 21st Century", Scientific American, http://doi.org/10.1038/scientificamerican0991-94, 265, Sep. 1991, pp. 94-104.
Whitley et al., "Visual Programming: The Outlook from Academia and Industry" Proceedings of the 7th Workshop on Empirical Studies of Programmers, http://dl.acm.org/citation.cfm?id=266415, pp. 180-208.
Gartner, Gartner Says 6.4 Billion Connected "Things" Will Be in Use in 2016, Up 30 Percent From 2015. Available at: https://www.gartner.com/en/newsroom/press-releases/2015-11-10-gartner-says-6-billion-connected-things-will-be-in-use-in-2016-up-30-percent-from-2015, Nov. 10, 2015, 3 pages.
"Wyliodrin", https://www.wyliodrin.com/, Retrieved on Jan. 7, 2020, 12 pages.
"LabVIEW System Design Software—National Instruments", http://www.ni.com/labview/, Jun. 20, 2016, 2 pages.
"Simulink—Simulation and Model-Based Design", http://www.mathworks.com/products/simulink/?requestedDomain=www.mathworks.com, May 17, 2016, 10 pages.
Max is a visual programming language for media. Cycling '74. from https://cycling74.com/products/max/, Jun. 27, 2016, 14 pages.
"Grasshopper", http://www.grasshopper3d.com/, Jun. 29, 2016, 17 pages.
"Game Engine Technology by Unreal", https://www.unrealengine.com/what-is-unreal-engine-4, Retrieved on Jun. 18, 2016, 6 pages.
"3DVIA Virtools", http://www.3dvia.com/products/3dvia-virtools/, Jun. 19, 2016, 2 pages.
"Dynamo BIM", http://dynamobim.org/, Jun. 29, 2016, 12 pages.
"Node-RED", http://nodered.org/, Jun. 28, 2016, 4 pages.
"SeeControl", Enterprise IoT Software Platform, http://www.seecontrol.com/, Apr. 17, 2016 18 pages.
Attar et al., "Sensor-Enabled Cubicles for Occupant-Centric Capture of Building Performance Data", http://web.a.ebscohost.com/abstractdirect=true&profile=ehost&scope=site&authtype=crawler&jml=00012505&AN=67217601&h=Kze6fZHXzdzyk%2fpQuv2Mq7BhVX9wqWkMQwYDrX6IZOmqmH%2fRQmjstmdaodyYKGOwxeoBcDGsahqjMbNar98egQ%3d%3d&crl=c&resultNs=AdminWebAuth&resultLocal=ErrCrlNotAuth&crlhashurl=login.aspx%3fdirect%3dtrue%26profile%.
"Tilt Brush by Google", http://www.tiltbrush.com/, Jun. 9, 2016, 11 pages.
"MOculus.io | VR-Plugin for Autodesk Maya", http://moculus.io/, Jun. 10, 2016, 18 pages.
"Connect the apps you love—IFTTT", https://ifttt.com/, Jun. 27, 2016, 11 pages.
"Simplelink SensorTag—TI.com", http://www.ti.com/ww/en/wireless_connectivity/sensortag2015/?INTC=SensorTag&HQS=sensortag, Jun. 21, 2016, 4 pages.
"Dweet.io—Share your thing—like it ain't no thang", http://dweet.io/, Jun. 30, 2016, 14 pages.
Final Office Action received for U.S. Appl. No. 15/636,517, dated Apr. 3, 2020, 65 pages.
Non-Final Office Action for U.S. Appl. No. 15/636,517 dated Dec. 6, 2019, 16 pages.
Non-Final Office Action for U.S. Appl. No. 15/636,517 dated Aug. 19, 2020, 27 pages.
Non-Final Office Action received for U.S. Appl. No. 15/636,517, dated Jun. 24, 2021, 36 pages.
National Instruments, "LabVIEW User Manual, Apr. 2003 Edition", (2003), 349 pages.

(56) References Cited

OTHER PUBLICATIONS

Final Office Action received for U.S. Appl. No. 15/636,517, dated Oct. 4, 2021, 30 pages.
Non Final Office Action received for U.S. Appl. No. 15/636,517 dated Jan. 14, 2022, 38 pages.
1 Final Office Action received for U.S. Appl. No. 15/636,517 dated May 5, 2022, 40 pages.
Non Final Office Action received for U.S. Appl. No. 15/636,517 dated Sep. 1, 2022, 32 pages.
Final Office Action received for U.S. Appl. No. 15/636,517 dated Mar. 9, 2023, 39 pages.
Sutherland, William Robert, "The On-Line Graphical Specification of Computer Procedures", Jan. 1966, 127 pages.

* cited by examiner

THREE DIMENSIONAL VISUAL PROGRAMMING INTERFACE FOR A NETWORK OF DEVICES

CROSS-REFERENCE TO RELATED APPLICATIONS

This application is a continuation of the U.S. patent application titled, "THREE DIMENSIONAL VISUAL PROGRAMMING INTERFACE FOR A NETWORK OF DEVICES," filed Jun. 28, 2017 and having Ser. No. 15/636,517, which claims the priority benefit of U.S. provisional patent application titled, "VISUAL PROGRAMMING INTERFACE FOR AUTHORING AND VIEWING A NETWORK OF DEVICES," filed on Jul. 1, 2016 and having Ser. No. 62/357,856. The subject matter of these related applications is hereby incorporated herein by reference.

BACKGROUND OF THE INVENTION

Field of the Invention

Embodiments of the present invention relate generally to a graphical user interface (GUI) and, more specifically, to a three dimensional (3D) visual programming interface for a network of devices.

Description of the Related Art

The ubiquity of computing devices has led to a proliferation of connected network devices, such as smart objects. This manifestation, known colloquially as the Internet of Things (IoT), is growing exponentially with over 20 billion objects expected to be connected by 2020. Taking full advantage of this network of smart objects requires tools that allow users to control and understand the complex web of logical connections between the smart objects.

To enable everyday users with limited programming skills to manage these connections, conventional tools implement two-dimensional (2D) interface environments. However, such conventional tools generally fail to provide information about a particular object's spatial relationship to other objects within a given networked environment. As a result, basic tasks, such as identifying a particular object within the environment, may be difficult. Also, when using conventional 2D interface environments, the functions of the objects and logical connections between the objects are not easily ascertainable to a user and require additional investigation and inquiry by the user. Further, programming or modifying the various functions that can be implemented by different objects within the networked environment and/or the connections between different objects within the networked environment can be challenging for users with limited programming skills. Finally, with conventional 2D interface environments, after executing the programming functions of the connected objects at runtime, understanding how each object operates within the total context of the networked environment can be quite difficult for users. Thus, if various objects do not operate/function correctly or as intended, inspecting or debugging those objects and/or the connections between the objects can be impractical or even impossible for most users.

As the foregoing illustrates, there is a need in the art for more effective interfaces for programming and viewing smart objects and connections within a networked environment.

SUMMARY OF THE INVENTION

One embodiment of the invention includes a computer-implemented method for programming and viewing a network of physical objects within a three-dimensional (3D) visual programming interface. The method includes displaying a 3D virtual environment comprising a first logic node and a second logic node, the 3D virtual environment representing the real-world environment comprising a first physical object and a second physical object. The first logic node represents a set of functions associated with the first physical object and the second logic node represents a set of functions associated with the second physical object. The method also includes receiving a first set of inputs for creating a first link between the first logic node and the second logic node. The method further includes, in response, displaying the first link between the first logic node and the second logic node within the 3D virtual environment, wherein the first link represents a first data connection between the first physical object and the second physical object.

At least one advantage of the disclosed technique is that the 3D visual programming interface enables users to easily program and understand the logical functions and the data connections between the logical functions that operate within a network of physical objects.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
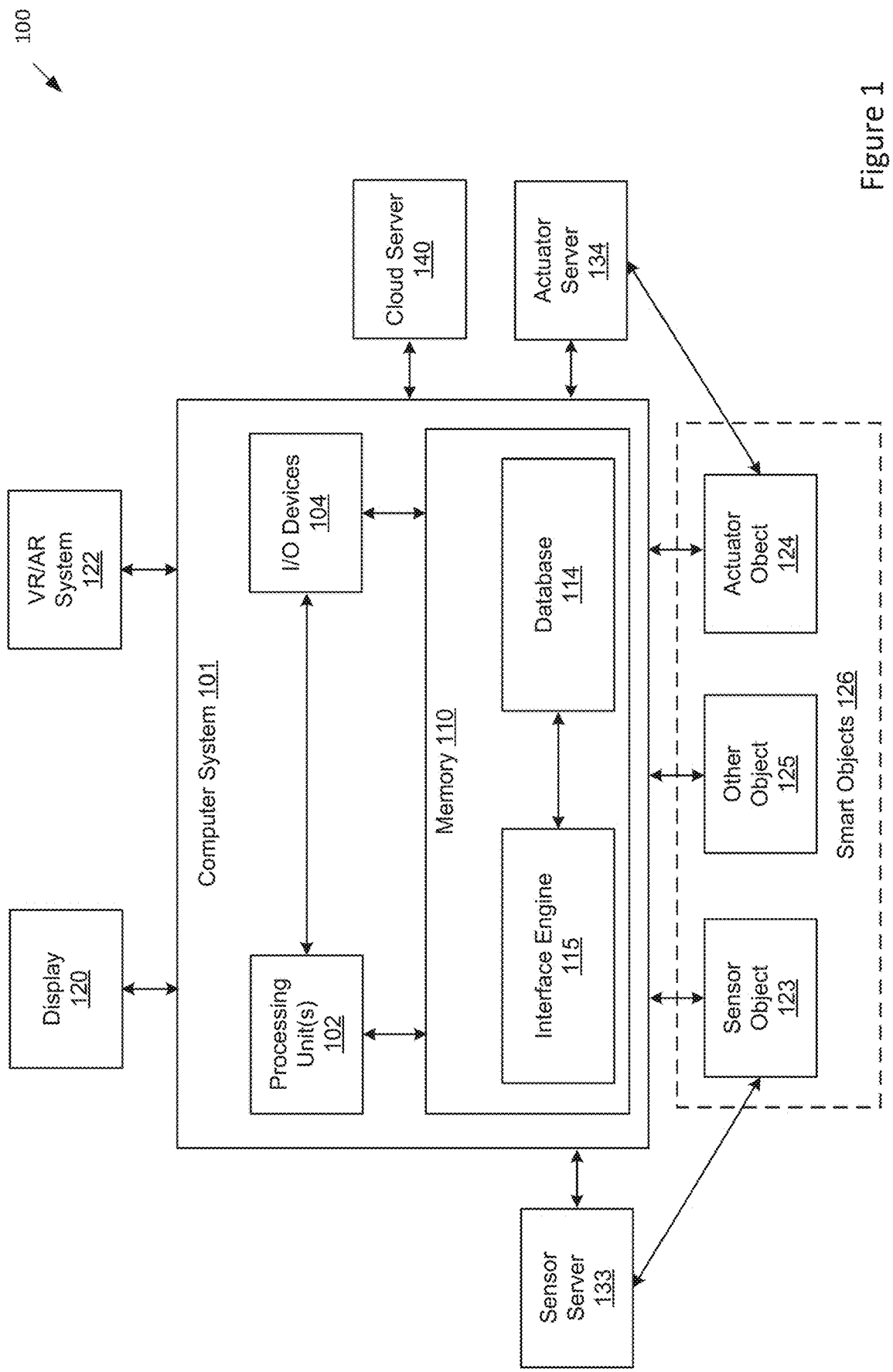
FIG. 1 is a block diagram of a three-dimensional (3D) visual programming system configured to implement one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into four sections. Section I describes an architecture of a 3D visual programming system within which embodiments of the present invention may be implemented. Section II describes systems and methods for displaying a 3D virtual environment comprising virtual objects for representing a real-world environment comprising physical objects. Section III describes systems and methods for authoring logic nodes (representing functions) and links between logic nodes within the 3D virtual environment and executing the logic nodes to implement the functions within the real-world environment. Section IV describes systems and methods for displaying data flows between logic nodes within the 3D virtual environment during runtime.

Embodiments of the invention are directed towards techniques for generating virtual representations of network devices/smart objects in a 3D visual programming interface (which may be referred to herein as an "interface"). The interface is executed on a computer system that is connected with a plurality of smart objects via a network. As described in Section II, the interface may display a 3D virtual environment containing multiple virtual objects that represents a real-world environment (such as a room, building, factory, etc.) containing multiple smart objects. Each smart object comprises a network device that is configured to perform a set of one or more functions, such as a sensor function or an actuator function. The 3D virtual environment displays virtual objects in a manner that is spatially accurate relative to the physical objects in the real-world environment. For each virtual object representing a particular physical object, a logic node (port node) is generated and displayed for the virtual object, the port node representing the set of functions associated with the particular physical object. As described in Section III, the interface enables users to create, delete, or modify different types of logic nodes (visually representing different types of functions) and create, delete, or modify links (visually representing data paths/connections) between logic nodes within the 3D virtual environment. The authoring of the logic nodes and links produces a program comprising a set of linked logic nodes that represent a set of connected functions. Upon receiving a "run" command, the computer system operates in conjunction with the smart objects to execute the program which implements the set of connected functions within the real-world environment. As described in Section IV, the interface displays visual representations of data flows between logic nodes within the 3D virtual environment when the program is executing. The data flows between the logic nodes are visually represented as particles moving between the logic nodes. The particles may be displayed with different colors, size, and volume based on attributes of the data flows. Data flow visualization allows the user to easily inspect the operation of the program and assist in debugging the program if necessary.

Section I: 3D Visual Programming System and Hardware

FIG. 1 is a block diagram of a 3D visual programming system 100 configured to implement one or more aspects of the invention. As shown, the system 100 includes, without limitation, a computer system 101 connected to a display device 120 and a head-mounted display device 122. The system 100 further includes a set of smart objects 126, a sensor server 133, an actuator server 134, and a cloud server 140 connected to the computer system via a network 150.

The computer system 101 includes a processor 102, input/output (I/O) devices 104, and a memory 110. Memory 110 includes an interface engine 115 configured to interact with a database 114. Processor 102 includes one or more processing cores. In operation, processor 102 is the master processor of computer system 101, controlling and coordinating operations of other system components. Memory 110 stores software applications and data for use by processor 102. Processor 102 executes software applications stored within memory 110 and optionally an operating system. In particular, processor 102 executes software and then performs one or more of the functions and operations set forth in the present application. The processor 102 may be any technically feasible form of processing device configured to process data and execute program code. The processor 102 could be, for example, and without limitation, a central processing unit (CPU), a graphics processing unit (GPU), an application-specific integrated circuit (ASIC), a digital signal processor (DSP), a field-programmable gate array (FPGA), and so forth.

Memory 110 may include a memory module or a collection of memory modules. Database 114 within memory 110 may store images, video, algorithms, graphical representations, rendering engines, tracking software, sensor data, network device data, lookup tables, and/or other types of data and parameters associated with tracking and managing network devices, generating graphical representations, displaying graphical representations, etc. The interface engine 115 within memory 110 is executed by the processor 102 to implement the overall functionality of the system 100. For example, and without limitation, network device data received via the system 100 could be processed by the interface engine 115 to detect and track one or more network devices and/or reference points within a particular environment and generate a representation of the network devices, network device parameters, connections and relationships between network devices, etc. The system 100 could then display representations of the network devices to a user, such as by overlaying the representations onto real-time images (e.g., images acquired and displayed with typical capture and display latency) of the environment and display the environment via a display device 120. Additionally, in some embodiments, the system 100 could display the representation of the network devices to the user by overlaying the representation onto the field of view of the user via a head-mounted display device 122 (e.g., a transparent augmented reality or virtual reality display).

I/O devices 104 are coupled to the processing unit 102 and the memory 110 and may include devices capable of receiving user input, output devices capable of generating output, and devices capable of both receiving input and providing output. Examples of input devices include a keyboard, a mouse, a touchscreen, a microphone, or other user input elements. Examples of output devices include a monitor, a printer, or other output elements. The input and output devices allow an end-user access to the system 100. Further, I/O devices 104 could include wired and/or wireless communication devices that send data to and/or receive data from a sensor 123 (e.g., a camera, depth sensor, radar sensor, etc.), a display screen (e.g., display device 120, head-mounted display device 122, etc.), network devices, network services (e.g., cloud services, web servers, etc.), a storage device, and/or other types of computing devices.

The display device 120 and the head-mounted display device 122 may include any technically feasible device for displaying images of a 3D virtual environment and/or graphical representations of network devices, network device parameters, connections between network devices, etc. In some embodiments, the display device 120 is included in a mobile computing device, such as a tablet computer. In addition, the head-mounted display device 122 may be included in a mobile computing device, such as a virtual reality headset (e.g., Oculus Rift®, HTC Vive®) and/or an augmented reality headset (e.g., Microsoft® HoloLens®).

The set of smart objects 126 may include a plurality of smart objects (network devices), each smart object comprising a physical object (e.g., lamp, fan, AC unit, vehicle etc.) that is embedded with hardware components (such as a processor and a sensor or actuator), software components, and network connectivity which enable the object to transmit and/or receive data over a network 150. The set of smart objects 126 may include one or more sensor objects 123, one or more actuator objects 124, or other types of smart objects 125 (not having a sensor or actuator). Each smart object 126 is capable of sending and/or receiving data to one or more devices (such as I/O devices 104 or other network devices) via the network 150. The set of smart objects 126 may comprise a set of network connected physical objects, an approach commonly referred to as the Internet of Things (IoT). The IoT allows objects to be sensed or controlled remotely across a network infrastructure. The network 150 may comprise any technically feasible communications or information network, wired or wireless, that allows data exchange, such as a wide area network (WAN), a local area network (LAN), a wireless (Wi-Fi) network, and/or the Internet, among others.

As shown, a sensor object 123 (referred to as a "sensor") may be connected to a sensor server 133 via the network 150, the sensor server 133 also being connected to the computer system 101 via the network 150. Alternatively, the sensor 123 may be directly connected to the computer system 101 via the network 150. A sensor object 123 may comprise a sensor device that is embedded into a physical object (such as a lamp, fan, etc.). In other embodiments, a sensor object 123 may comprise the sensor device itself when not embedded into another physical object (a stand-alone sensor). Although only one sensor 123 is illustrated in FIG. 1, in other embodiments, the system 100 may comprise a plurality of sensors 123.

The sensor(s) 123 may include, without limitation, temperature sensors, visible light sensors, thermal imaging sensors, laser based devices, ultrasonic sensors, infrared sensors, radar sensors, depth sensors, global positioning system (GPS) devices, magnetometers, inertial sensors, gyroscopes, accelerometers, etc. Upon receiving power, each type of sensor is designed to continually detect a particular type of environmental attribute and continually transmit a particular type of data. For example, once powered, a temperature sensor continually detects the temperature within an environment (e.g., room or office) and continually transmits temperature data. Each sensor 123 may be preconfigured to transmit data to a particular sensor server 133 via the network 150, whereby the sensor server 133 receives and stores the sensor data. The computer system 101 may obtain the data for a particular sensor 123 by accessing and retrieving the sensor data from the sensor server 133 via the network 150.

An actuator object 124 (referred to as an "actuator") may be connected to an actuator server 134 via the network 150, the actuator server 134 also being connected to the computer system 101 via the network 150. Alternatively, the actuator 124 may be directly connected to the computer system 101 via the network 150. Although only one actuator 124 is illustrated in FIG. 1, in other embodiments, the system 100 may comprise a plurality of actuators 124. An actuator(s) 124 has actuation capabilities and may be designed to perform a specific actuation function upon receiving a command from an actuator server 134 to execute the function. For example, in a simple case, a lamp object may comprise an actuation function that turns the lamp object on or off. Other actuation functions of the lamp may include changing the color of the light or the brightness that are achieved by changing parameters of the actuation action. As another example, an HVAC system (smart object) may have an actuator function for adjusting temperature and airflow through the HVAC system, or an actuator function for changing which baffles are open/closed to direct airflow. As another example, laser cutter (smart object) may have an actuator function for adjusting the speed of its cut, or the pattern it is cutting. Once powered, each actuator 124 is designed to continually query a web service from a particular actuator server 134 for the command via the network 150. The computer system 101 may cause an actuator 124 to execute/actuate its function by sending a command to the particular actuator server 134 via the network, which then relays the command to the actuator 124 via the network causing the actuator 124 to execute its function.

Generally, computer system 101 is configured to coordinate the overall operation of the system 100. In other embodiments, the computer system 101 may be coupled to, but separate from other components of the system 100. However, the embodiments disclosed herein contemplate any technically feasible system configured to implement the functionality of the system 100. In some embodiments, the computer system 101 may comprise a personal computer, server computer, mobile device, headset, video game console, personal digital assistant, mobile phone, or any other device suitable for practicing one or more embodiments described herein. In other embodiments, the computer system 101 may comprise an augmented reality (AR) system or a virtual reality (VR) system capable of rendering and operating the 3D visual programming interface in an augmented reality environment or virtual reality environment, respectively. In further embodiments, computer system 101 is integrated with the display device 120, head-mounted display device 122, and/or smart object 126. In other embodiments, the computer system 101 may be coupled to, but separate from the display device 120, head-mounted display device 122, and/or smart objects 126. In such embodiments, the display device 120, head-mounted display device 122, and/or smart object 126 may include separate processors that receive data (e.g., images, instructions, etc.) from and transmit data to the computer system 101. However, the embodiments disclosed herein contemplate any technically feasible system configured to implement the functionality of the system 100.

Section II: Interface for Displaying a 3D Virtual Environment

Figure 2:
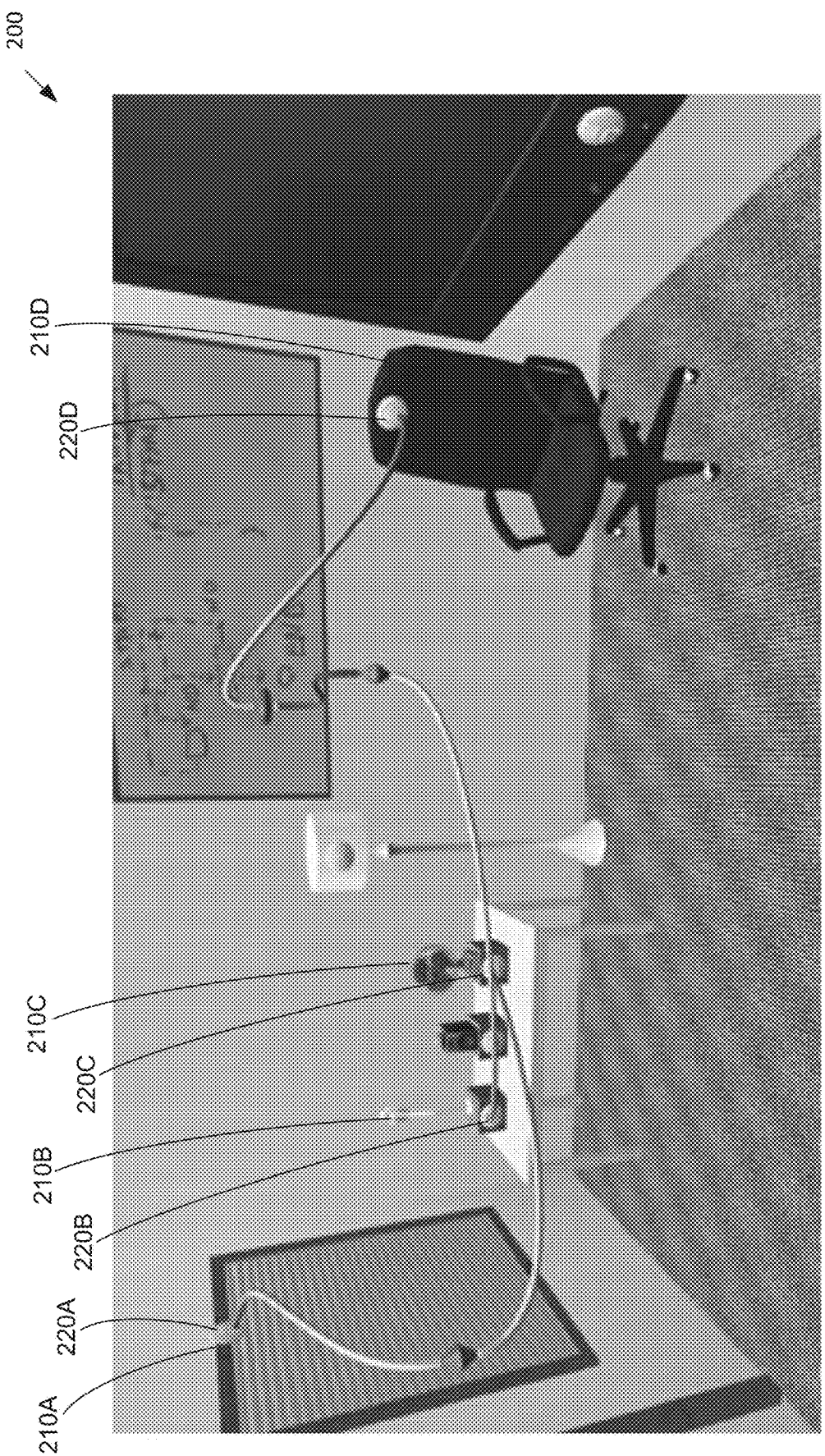
FIG. 2 shows a first 3D virtual environment of the 3D visual programming interface generated by the interface engine of FIG. 1, according to various embodiments of the present invention.

The computer system 101 (shown in FIG. 1) is configured to execute the interface engine 115 which generates and displays a 3D visual programming interface for programming and viewing the network of smart objects 126. The interface may display a 3D virtual environment containing multiple virtual objects that represents a particular real-world environment (such as a room, office building, factory, vehicle, etc.) containing multiple smart objects. Each smart object comprises a network device that is configured to perform a set of one or more functions, such as a sensor function or an actuator function. The 3D virtual environment displays virtual objects in a manner that is spatially accurate relative to the physical objects in the real-world environment, FIG. 2 shows a first 3D virtual environment 200 of the 3D visual programming interface generated by the interface engine 115 of FIG. 1, according to various embodiments of the present invention. The first 3D virtual environment 200 visually represents a first real-world environment comprising a small office. The first real-world environment comprises a plurality of physical objects (smart objects), including a temperature sensor, table lamp, fan, and an office chair. For each physical object in the first real-world environment, the interface engine 115 generates and displays a virtual object representing the physical object within the first 3D virtual environment 200. For example, the interface engine 115 may display a virtual temperature sensor 210A, virtual table lamp 210B, virtual fan 210C, and a virtual office chair 210D.

In some embodiments, the interface engine 115 generates and displays the dimensions of the 3D virtual environment based on the physical dimensions of the corresponding real-world environment. For example, the interface engine 115 may receive environment metadata that describes physical dimensions of the real-world environment from a user or a building information management (BIM) model. A BIM model may comprise a blueprint model of the real-world environment created when the real-world environment is designed. The physical dimensions of the real-world environment may include length, width, and height dimensions for physical structures (e.g., walls, flooring, ceiling, windows, etc.) of the real-world environment. The interface engine 115 may then map the physical dimensions of the physical structures to 3D (x, y, z) coordinates within a 3D virtual space to render a 3D virtual environment that represents the real-world environment. Thus, the 3D virtual environment will have a spatial appearance and scale that simulates the spatial appearance and scale of the corresponding real-world environment. In the example of FIG. 2, the first 3D virtual environment 200 represents a first real-world environment comprising a small office, the first 3D virtual environment 200 having a spatial appearance and scale that simulates the first real-world environment.

In some embodiments, the interface engine 115 generates and displays each virtual object within the 3D virtual environment based on the location of the corresponding physical object within real-world environment. For each physical object, the interface engine 115 may receive object metadata associated with each physical object from a user or a BIM model. The object metadata associated with each physical object may include the location of the physical object within the real-world environment. For example, the location of the physical object may be expressed as length, width, and height coordinates for the physical object within the real-world environment. The interface engine 115 may then map the physical location of a physical object to 3D (x, y, z) coordinates within the 3D virtual environment to determine the location of the corresponding virtual object within the 3D virtual environment. Thus, the 3D virtual environment displays virtual objects having spatial relationships and scale of the corresponding physical objects in the real-world environment. In the example of FIG. 2, the first 3D virtual environment 200 displays the virtual objects 210A-210D in a manner that is spatially accurate and to scale relative to the corresponding physical objects in the real-world environment. Thus, a virtual object that corresponds to a particular physical object may be easily identified by a user for programming and/or viewing the virtual object and corresponding physical object.

After generating and displaying the 3D virtual environment and virtual objects within the 3D virtual environment, the interface engine 115 then generates and displays a port node for each virtual object. Each virtual object represents a particular physical object, and a port node comprises a specific type of logic node that represents a set of functions associated with a corresponding physical object. For each physical object, the interface engine 115 may receive object metadata associated with each physical object (e.g., from a user or a BIM model) that further includes descriptions of each function of the physical object. For example, the metadata may specify a sensor function and type of sensor function (e.g., temperature, light, sound, etc.), an actuator function and type of actuator function, or another type of function comprising a program construct. For example, a first physical object may be configured to perform a set of functions including a first sensor function, a second actuator function, and a third function comprising a logical program construct. The interface engine 115 then generates and displays a first port node for a first virtual object that corresponds to the first physical object, the first port node representing the three functions associated with the first physical object.

As shown in FIG. 2, the interface engine 115 generates and displays a port node 220 for each virtual object 210, such as a first port node 220A for the virtual temperature sensor 210A, a second port node 220B for the virtual table lamp 210B, a third port node 220C for the virtual fan 210C, and a fourth port node 220D for the virtual office chair 210D. The first port node 220A represents a first set of functions associated with the temperature sensor, the second port node 220B represents a second set of functions associated with the table lamp, and so forth.

The interface engine 115 displays the port node for a particular virtual object on top of or adjacent to the virtual object within the 3D virtual environment. Thus, the port node representing functions of a corresponding physical object is also displayed at a location within the 3D virtual environment that is based on the location of the corresponding physical object within real-world environment. Consequently, the port nodes are also displayed in the 3D virtual environment having spatial relationships and scale of the corresponding physical objects in the real-world environment.

Figure 3:
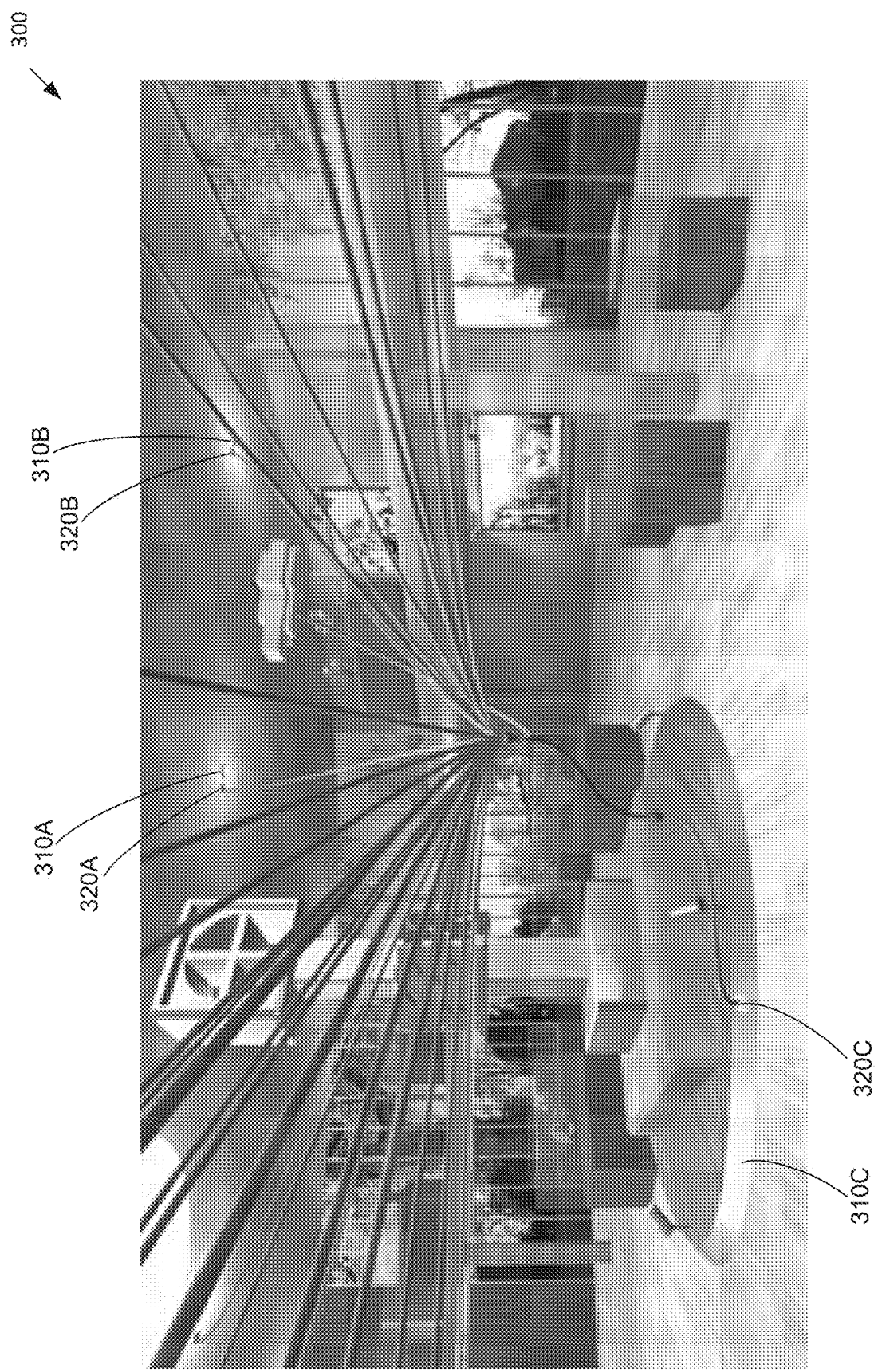
FIG. 3 shows a second 3D virtual environment of the 3D visual programming interface generated by the interface engine of FIG. 1, according to various embodiments of the present invention.

FIG. 3 shows a second 3D virtual environment 300 of the 3D visual programming interface generated by the interface engine 115 of FIG. 1, according to various embodiments of the present invention. The second 3D virtual environment 300 visually represents a second real-world environment comprising a museum exhibition room. The second real-world environment includes a plurality of physical objects, including a plurality of foot traffic sensors (including first and second foot traffic sensors) and an exhibit having an embedded actuator. For each physical object in the second real-world environment, the interface engine 115 generates and displays a virtual object representing the physical object within the second 3D virtual environment 300. For example, the interface engine 115 may display a first virtual foot traffic sensor 310A, a second virtual foot traffic sensor 310A, and a virtual exhibit 310C. The interface engine 115 also generates and displays a port node 320 for each virtual object 310, such as a first port node 320A for the first virtual foot traffic sensor 310A, a second port node 320B for the second virtual foot traffic sensor 310B, and a third port node 320C for the virtual exhibit 310C. The first port node 320A represents a first set of functions associated with the first foot traffic sensor, the second port node 320B represents a second set of functions associated with the second foot traffic sensor, and so forth.

Figure 4:
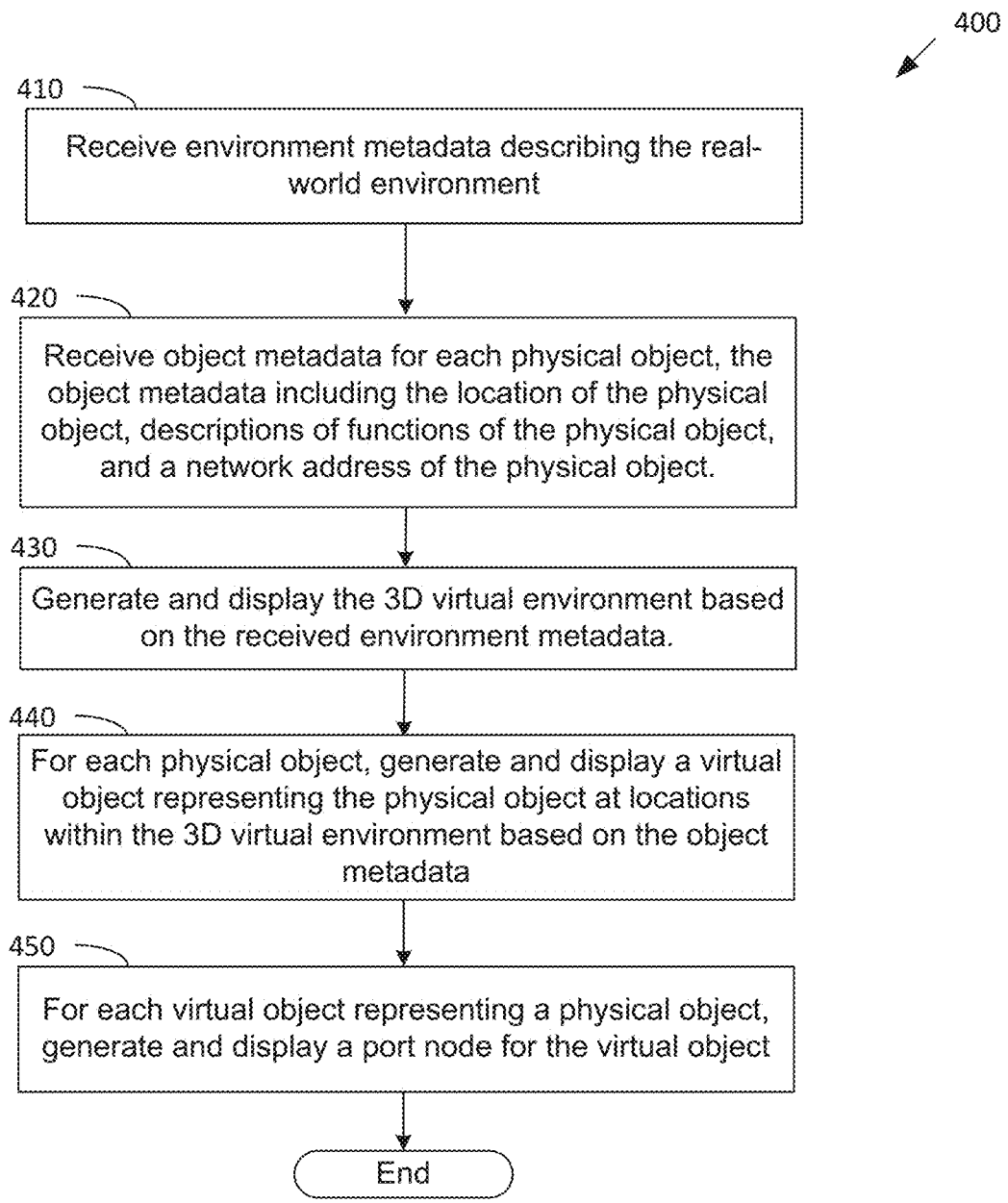
FIG. 4 illustrates a flow diagram of method steps for generating a 3D virtual environment comprising a plurality of virtual objects representing a plurality of physical objects in a real-world environment, according to various embodiments of the present invention.

FIG. 4 illustrates a flow diagram of method steps for generating a 3D virtual environment comprising a plurality of virtual objects representing a plurality of physical objects in a real-world environment, according to various embodiments of the present invention. Although the method steps are described in conjunction with the systems of FIG. 1-3, persons skilled in the art will understand that any system configured to perform the method steps, in any order, is within the scope of the present invention. In some embodiments, the method steps are performed by a interface engine 115 executing on a computer system 101 connected to the plurality of physical smart objects (network devices) via a network 150.

As shown, a method 400 begins at step 410, where interface engine 115, when executed by processing unit 102, receives environment metadata describing the real-world environment. For example, the environment metadata may be received from a user or from an imported building information management (BIM) model of the real-world environment. In other embodiments, the environment metadata may be received in a different manner. The environment metadata may describe physical dimensions of the real-world environment, such as length, width, and height dimensions for physical structures of the real-world environment.

At step 420, the interface engine 115 receives object metadata for each physical object within the real-world environment. For example, the object metadata may be received from a user or from an imported building information management (BIM) model. In other embodiments, the object metadata may be received in a different manner. For each physical object, the object metadata may include the physical location of the physical object within the real-world environment, descriptions of each function of the physical object, and a network address (such as an IP address or MAC address) of the physical object. The physical location of the physical object may comprise length, width, and height coordinates for the physical object within the real-world environment. The descriptions of each function of the physical object may include a sensor function and type of sensor function (e.g., temperature, light, sound, etc.), an actuator function and type of actuator function, or another type of function comprising a program construct. The network address of the physical object may be used by the interface engine 115 to connect and communicate with the physical object via the network 150.

At step 430, the interface engine 115 generates and displays the 3D virtual environment based on the received environment metadata. At step 440, for each physical object, the interface engine 115 generates and displays a virtual object representing the physical object at locations within the 3D virtual environment based on the received object metadata. At step 450, for each virtual object representing a physical object, the interface engine 115 generates and displays a port node on or adjacent to the virtual object, the port node representing a set of function associated with the corresponding physical object. The method 400 then ends.

Section III: Authoring Logic Nodes and Links

After the 3D visual programming interface generates and displays the 3D virtual environment comprising a plurality of virtual objects and a plurality of corresponding port nodes, the 3D visual programming interface enables the user to author logic nodes and links between the logic nodes. As described above, a port node comprises one type of logic node and represents a set of functions of a corresponding physical object. The port nodes are automatically generated and displayed within the 3D virtual environment by the interface engine 115 based on object metadata. In the authoring stage, a user can create different types of logic nodes (other than port nodes) and links between the logic nodes within the 3D virtual environment. A logic node represents a set of one or more functions, each function comprising a specific type of task that can be implemented via hardware, software, or a combination of hardware and software. For example, a function can be implemented through a sensor, actuator, or by a program construct executed by the computer system 101. In general, the logic nodes authored in the authoring stage represent functions that are implemented by a program construct executed by the computer system 101.

In particular, the 3D visual programming interface enables users to create, delete, or modify different types of logic nodes (visually representing different types of functions) and create, delete, or modify links (visually representing data paths/connections) between logic nodes within the 3D virtual environment. The authoring of the logic nodes and links produces a program comprising a set of linked logic nodes that represent a set of connected functions. Upon receiving a "run" command, the computer system 101 operates in conjunction with the physical smart objects to execute the program, which implements the set of connected functions within the real-world environment. Thus, the 3D visual programming interface enables users to program behaviors of physical objects in a 3D virtual environment that implements a visual programming language.

Figure 5:
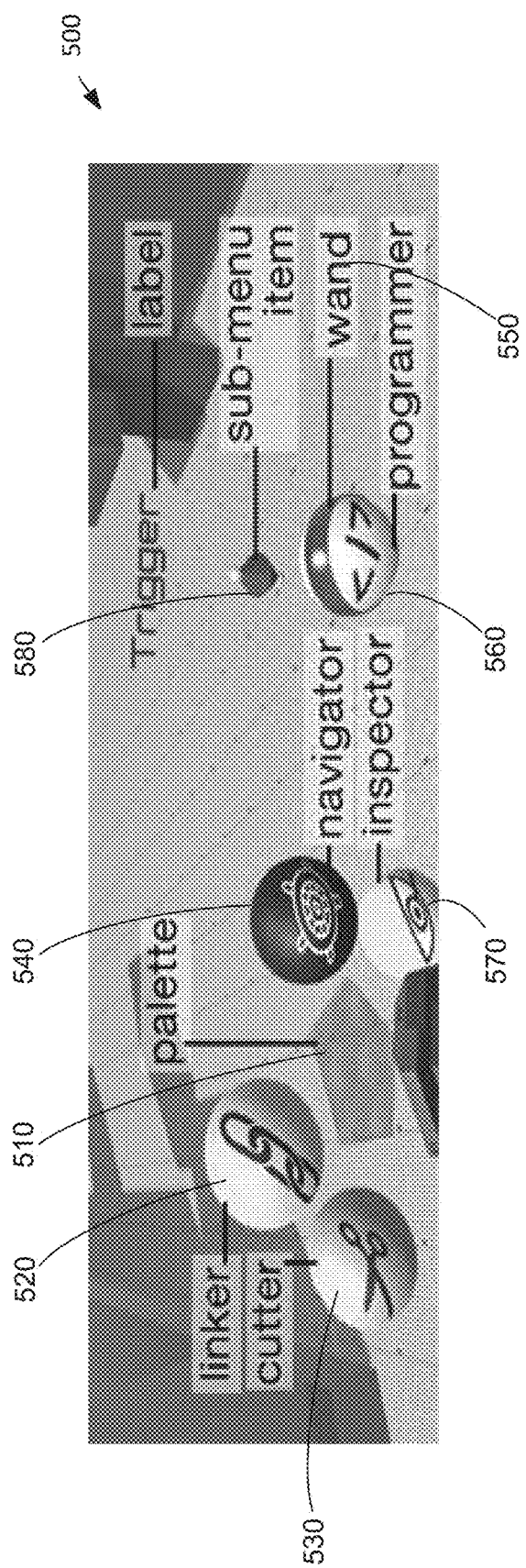
FIG. 5 shows a tool group of selectable tools and menu items of the 3D visual programming interface, according to various embodiments of the present invention.

The 3D visual programming interface provides a tool group of selectable tools and menu items for authoring logic nodes and links and assisting in data flow visualization (discussed below in Section IV). FIG. 5 shows a tool group 500 of selectable tools and menu items of the 3D visual programming interface, according to various embodiments of the present invention.

As shown, the tool group 500 includes a plurality of tools fixed to a palette 510 comprising a rotational menu, each tool being user-selectable for performing particular authoring and data flow visualization functions. The tool group 500 includes a linker tool 520, cutter tool 530, navigator tool 540, wand tool 550, programmer tool 560, inspector tool 570, and sub-menu 580. The linker tool 520 enables users to create links between logic nodes and the cutter tool 530 enables users to delete links between logic nodes. The navigator tool 540 enables users to move the viewing position within the 3D virtual environment. The wand tool 550 enables users to select and operate the tools and to move and place logic nodes within the 3D virtual environment. The programmer tool 560 enables users to select a particular type of logic node and create the logic node type with the 3D virtual environment. The inspector tool 570 assists a user with data flow visualization (discussed below in Section IV). Some tools (such as the programmer tool 560 and the inspector tool 570) may contain a sub-menu 580 comprising multiple functions/tools which can be browsed and selected by the user. To select and operate the tools and sub-menu, the user may use conventional input devices such as a mouse, trackball, keyboard, etc. In other embodiments, the user may select and operate the tools and sub-menu using AR or VR controls that are rendered within an AR or VR environment.

Figure 6:
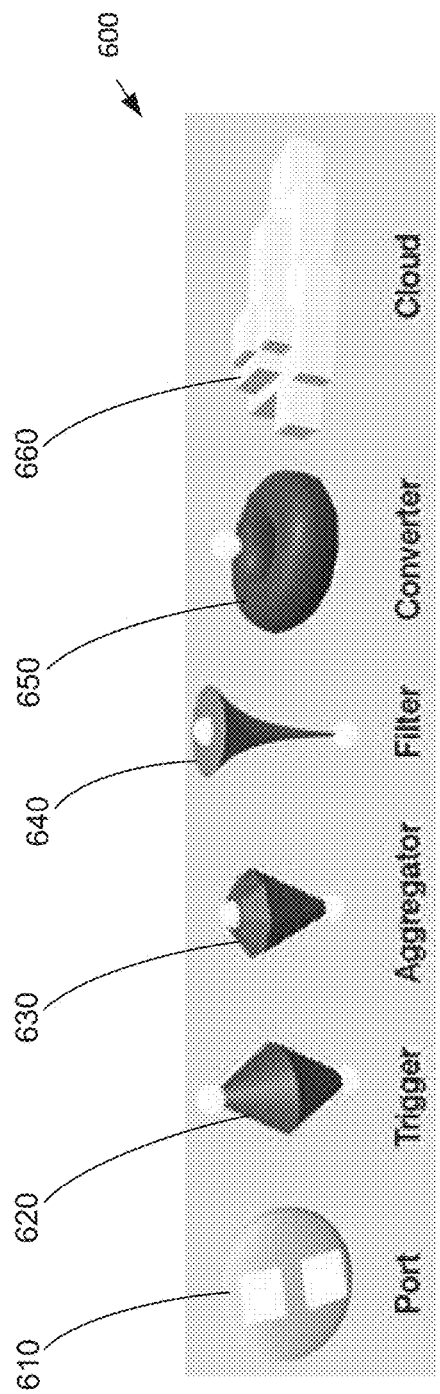
FIG. 6 shows a set of different types of logic nodes provided by the 3D visual programming interface of Figure [ ], according to various embodiments of the present invention.

The 3D visual programming interface provides different types of logic nodes (representing different types of functions) that may be selected by a user and placed within the 3D virtual environment. The interface may display the different types of logic nodes with different visual appearances. FIG. 6 shows a set of different types of logic nodes 600 provided by the 3D visual programming interface, according to various embodiments of the present invention. The set of logic nodes 600 include a port node 610, trigger node 620, aggregator node 630, filter node 640, converter node 650, and a cloud node 660. As shown, each type of logic node is displayed with a distinct visual appearance so that the user can easily identify the type of each logic node displayed within the 3D virtual environment. For example, the interface may display the different types of logic nodes with different colors, shapes, and/or sizes. As discussed above, a port node 610 represents a set of functions (such as sensor or actuator functions) associated with a corresponding physical object.

A trigger node 620 represents an a trigger function that invokes a particular action if a specific set of one or more rules/conditions is satisfied by the received input data. The set of rules/conditions (such as a threshold) may be set by the user. During program execution, when a trigger node is called and executed, the trigger function compares received input data to the set of conditions. If the set of conditions is met, then the trigger function calls one or more other logic nodes that are connected to the output of the trigger node for execution. If the set of conditions is not met, then the trigger function does not call the one or more other logic nodes that are connected to the output of the trigger node and the other logic nodes are not executed. For example, if the set of conditions is met and the output of the trigger node is connected to a port node representing an actuator function associated with an actuator object, the trigger function causes a command to be sent to the actuator object to execute the actuator function. As another example, if the set of conditions is met and the output of the trigger node is connected to another logic node representing another function, the trigger function calls the other logic node and the other function is executed.

An aggregator node 630 represents an aggregator function that receives multiple input values from multiple logic nodes, and aggregates the multiple input values into a single value which is output by the aggregator function. The single value that is output by the aggregator function may be based on a rule or parameter set by the user. For example, the single value may comprise an average or sum value. During program execution, when an aggregator node is called and executed, the aggregator function receives the multiple input values and determines the single output value using the specified rule or parameter. The aggregator function then calls the subsequent logic node connected to the output of the aggregator node by sending the single value to the subsequent logic node, which causes the subsequent logic node to be executed using the single value as an input value.

A filter node 640 represents a filter function for smoothing received input data (such as sensor data). The filter function may apply standard operations, such as low-pass filtering, to smooth potentially noisy sensor data. The filter function then calls the subsequent logic node connected to the output of the filter node by sending the smoothed data to the subsequent logic node, which causes the subsequent logic node to be executed using the smoothed data as an input data.

A converter node 650 represents a converter function for converting data between different types or ranges of values based on a rule or parameter set by the user. For example, the converter function may receive input data of a first type, convert the data to a second type, and output the second type of data. The type of input data and/or the type of output data may be based on a rule or parameter set by the user. The converter function may convert the input data type to another data type using standard type-casting operations by examining the input data type and using a lookup table and series of heuristics to convert to the input data type to the desired output data type. Also, the converter function may receive input values within a first range of values and convert the input values to a second range of values based on a rule or parameter set by the user. For example, the converter function may comprise a "magnitude" function that receive input values and outputs the magnitude of the input values. As another example, the converter function may comprise an "invert" function that receives high value (e.g., 1) and outputs a low value (e.g., 0). During program execution, when an converter node is called and executed, the converter function receives the input data and determines the converted output data using the specified rule or parameter. The converter function then calls the subsequent logic node connected to the output of the converter node by sending the converted output data to the subsequent logic node, which causes the subsequent logic node to be executed using the converted output data as input data.

The cloud node 660 represents a cloud storage function for sending data to an external cloud server for storage (i.e., uploading data to the cloud) as specified by a rule or parameter set by the user. The cloud node 660 allows the user to log data to a cloud storage for later retrieval and/or inspection. The cloud server provides a real-time cloud-based data logging service for users interested in tracking operational data (e.g. to predict equipment breakdowns or reduce energy costs) in a real-world environment. During program execution, when a cloud node is called and executed, the cloud storage function receives input data from a logic node connected to the input of the cloud node 660 and sends/transmits the received data to a specified external cloud server for storage via a network. In particular, when the cloud node 660 is called, the cloud storage function performs an HTTP request to call an external web service of the external cloud server, whereby the HTTP request encodes the transmitted data, the identity of the transmitted data, and time stamps the transmitted data.

Each logic node comprises a single input connector and/or a single output connector. The input connector of a current logic node is for receiving input data from one or more previous logic nodes connected to the input connector of the current logic node. The output connector of a current logic node is for sending output data to one or more subsequent logic nodes connected to the output connector of the current logic node. Although a logic node includes a single input connector and a single output connector, the single input connector may receive input data from several previous logic nodes and the single output connector may send output data to several subsequent logic nodes. Some logic nodes may comprise only an input connector, such as a port node that represents an actuator function or a cloud node that represents a cloud storage function. Some logic nodes may comprise only an output connector, such as a port node that represents a sensor function.

Some logic nodes may comprise both an input connector and an output connector, such as a trigger node 620, aggregator node 630, filter node 640, and converter node 650. For logic nodes having both an input connector and an output connector, the interface may consistently display these logic nodes with the input connectors at the top of the logic nodes and the output connectors at the bottom of the logic nodes, whereby the data always flows from the top to the bottom of these logic nodes. By consistently displaying the input and output connectors of the logic nodes in this manner, the interface provides an indication of the direction of data flow within the 3D virtual environment. As referred to herein, a "previous" logic node may comprise a logic node connected to the input connector of a current logic node and a "subsequent" logic node may comprise a logic node connected to the output connector of a current logic node.

Figure 7:
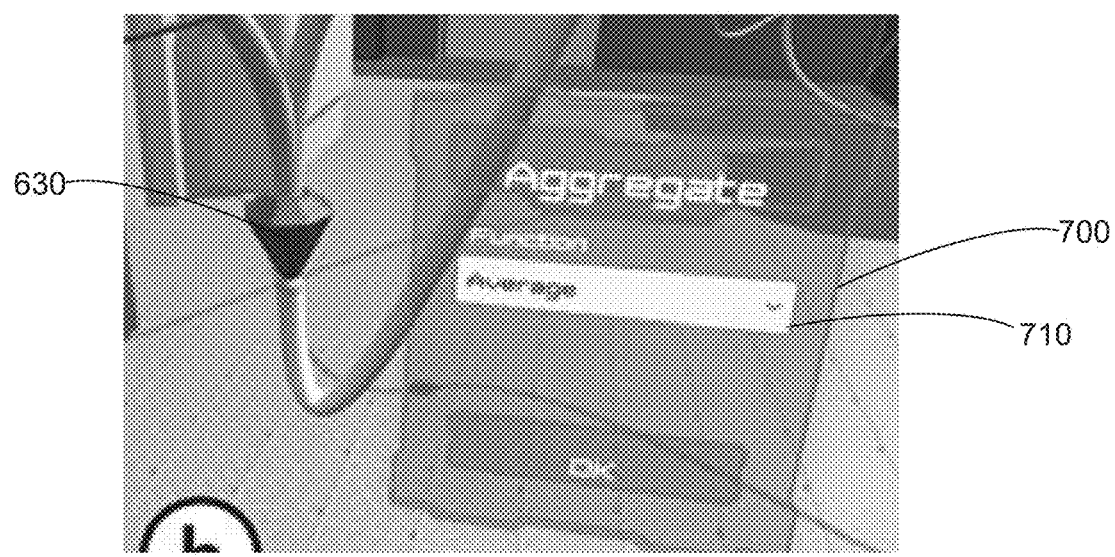
FIG. 7 shows an exemplary configuration GUI displayed for an aggregator node, according to various embodiments of the present invention.

As discussed above, some logic nodes may be configured by a rule or parameter set by the user. For example, the configurable logic nodes may include the trigger node 620, aggregator node 630, the converter node 650, and the cloud node 660. For each configurable logic node, the interface may display a distinct configuration GUI specific to each configurable logic nodes that enables the user to configure rules and/or parameters of the configurable logic node. The interface may display the configuration GUI for a configurable logic node upon receiving a particular user input (such as receiving a right-click selection of the configurable logic node or receiving selection of the configurable logic node with the programmer tool). FIG. 7 shows an exemplary configuration GUI 700 displayed for an aggregator node 630, according to various embodiments of the present invention. As shown, the configuration GUI 700 displays at least one rule or parameter 710 that may be specified by the user for the aggregator node 630.

As discussed above, a port node 610 represents a set of one or more functions (such as sensor or actuator functions) associated with a corresponding physical object. To reduce visual cluttering, the interface may display a single port node representing all functions of the corresponding physical object. During the authoring stage, when a link is made to a port node, a specific function must be selected from the set of functions represented by the port node by the user. To assist in the selection of the specific function, the interface may display a distinct visual representation/icon for each function in the set of functions of the port node. In some embodiments, the interface displays a set of icons representing the set of functions of the port node only in response to the user selecting the port node (e.g., for linking to another logic node). In this manner, the visual cluttering is reduced in the 3D virtual environment when the port node has not been selected.

Figure 8:
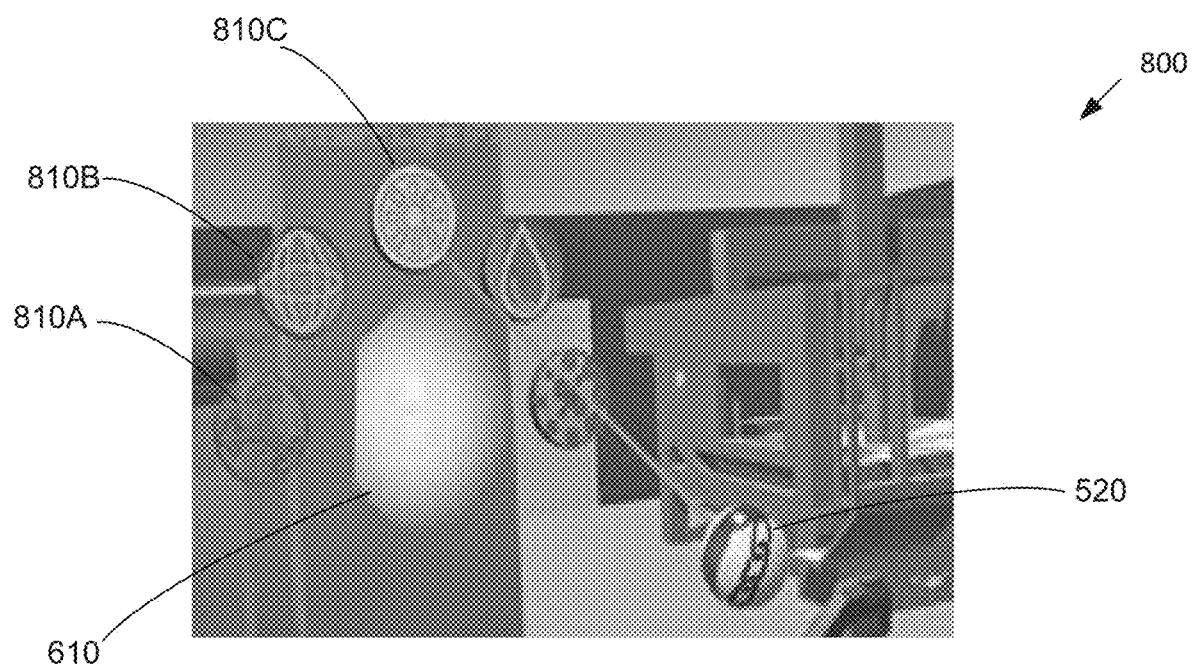
FIG. 8 shows an exemplary screenshot of the 3D visual programming interface showing a set of icons displayed for a port node, according to various embodiments of the present invention.

FIG. 8 shows an exemplary screenshot 800 of the interface showing a set of icons displayed for a port node 610, according to various embodiments of the present invention. In the example of FIG. 8, the interface displays the set of icons (e.g., in an arc around the port node 610) when the user selects the port node 610 for linking to another logic node using the linker tool 520. Each icon 810 (such as icon 810A, 810B, 810C) in the set of icons represents a particular function in the set of functions of the port node. Each icon 810 in the set of icons is displayed with a distinct appearance that allows the user to easily identify the type of function that each icon 810 represents. A specific function of the port node 610 is then selected by the user by selecting the icon 810 that represents the specific function from the set of icons.

The interface enables users to creates links between logic nodes. Each such link represents a data path/connection between two logic nodes. A link is visually displayed by the interface as a curved pipe connecting two logic nodes. Each link may be displayed with a particular appearance to assist users in identifying and understanding the data paths/connections between the logic nodes. For example, the color of each end of a link may match the color of the logic node at the opposite end of the link.

Figure 9:
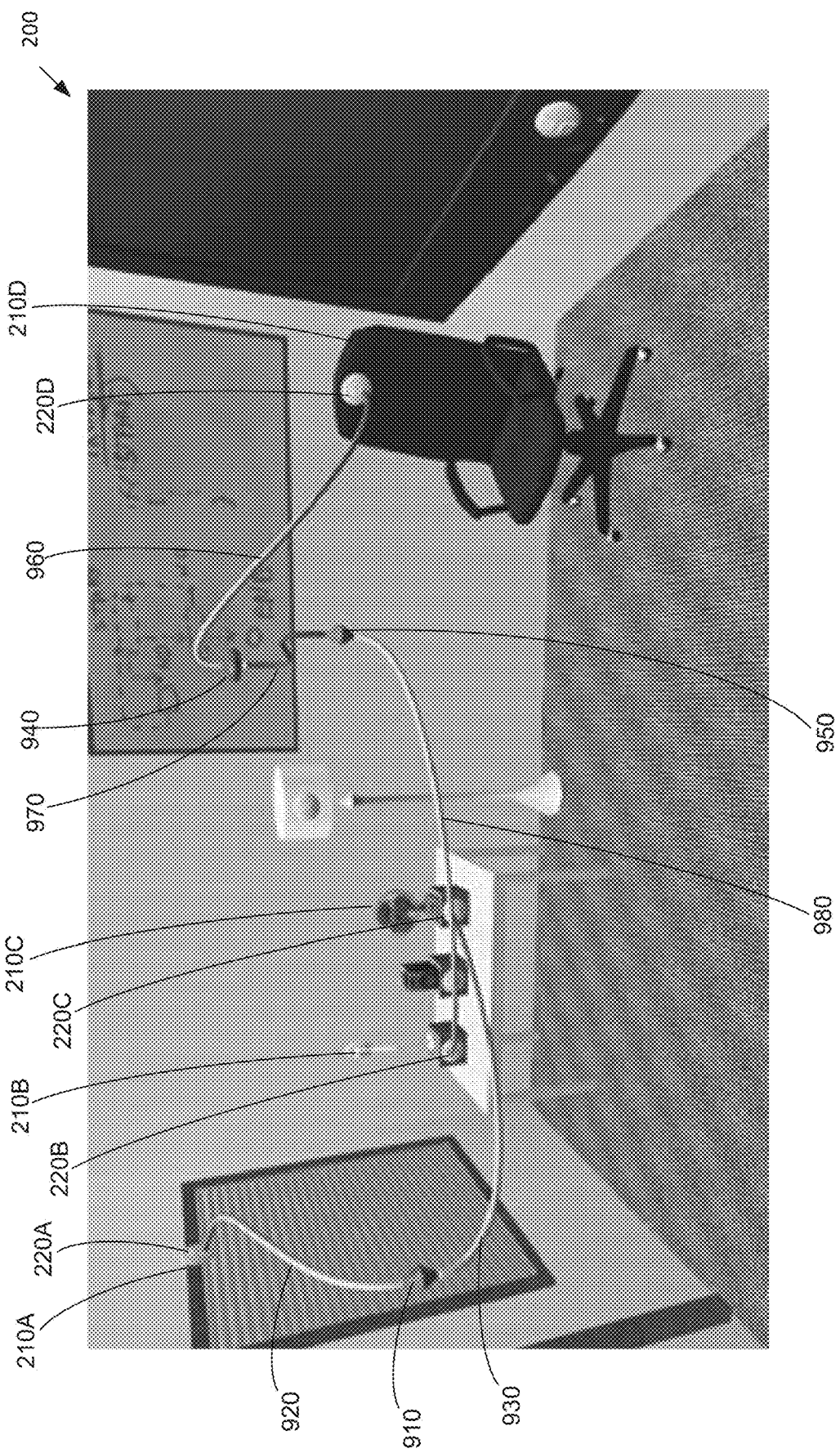
FIG. 9 shows the first 3D virtual environment of FIG. 2 during an authoring stage, according to various embodiments of the present invention.

FIG. 9 shows the first 3D virtual environment 200 of FIG. 2 during an authoring stage, according to various embodiments of the present invention. The first 3D virtual environment 200 visually represents a first real-world environment comprising a small office. The first real-world environment comprises a plurality of physical objects (smart objects), including a temperature sensor, table lamp, fan, and an office chair. FIG. 9 illustrates two simple examples of trigger-action pairings for smart objects.

In the first example shown in FIG. 9, the user wishes to have a fan (represented by the virtual fan 210C) automatically turn on when a temperature sensor (represented by the virtual temperature sensor 210A) senses a particular threshold temperature value within the first real-world environment. The first port node 220A represents a temperature sensor function of the temperature sensor and the virtual temperature sensor 210A and the third port node 220C represents an actuator function of the fan and the virtual fan 210C. The user selects a first trigger node 910 and places the first trigger node 910 between the first port node 220A of the virtual temperature sensor 210A and the third port node 220C of the virtual fan 210C within the first 3D virtual environment 200 (e.g., by using the programmer tool 560). The user then creates a first link 920 from an output connector of the first port node 220A to the input connector of the first trigger node 910 (e.g., using the linker tool 520). The user then creates a second link 930 from an output connector of the first trigger node 910 the input connector of the third port node 220C (e.g., using the linker tool 520). The user may also configure the rules or parameters of the first trigger node 910 via a configuration GUI that is displayed when the first trigger node 910 is selected. Through the configuration GUI, the user may configure the first trigger node 910 to actuate the third port node 220C (execute the actuator function) upon the first trigger node 910 receiving a threshold temperature value from the first port node 220A. The first 3D virtual environment 200 indicates the direction of data flow between the logic nodes. In particular, the direction of data in the first example flows from the top of the first trigger node 910 to the bottom of the first trigger node 910.

In the second example shown in FIG. 9, the user wishes to have a table lamp (represented by the virtual table lamp 210B) automatically turn on when the office chair (represented by the virtual office chair 210D) senses any motion (e.g., when the user sits down on the office chair). The fourth port node 220D represents a motion sensor function or an accelerometer function of the office chair and the virtual office chair 210D and the second port node 220B represents an actuator function of the table lamp and virtual table lamp 210B. The user selects a converter node 940 and places the converter node 940 between the fourth port node 220D of the virtual office chair 210D and the second port node 220B of the virtual table lamp 210B within the first 3D virtual environment 200 (e.g., by using the programmer tool 560). The user also selects a second trigger node 950 and places the second trigger node 950 between the converter node 940 and the second port node 220B of the virtual table lamp 210B within the first 3D virtual environment 200 (e.g., by using the programmer tool 560). The user then creates a third link 960 from an output connector of the fourth port node 220D to the input connector of the converter node 940 (e.g., using the linker tool 520). The user then creates a fourth link 970 from an output connector of the converter node 940 to the input connector of the second trigger node 950. The user then creates a fifth link 980 from an output connector of the second trigger node 950 to the input connector of the second port node 220B of the virtual table lamp 210B. The user may also configure the rules or parameters of the converter node 940 via a configuration GUI that is displayed when the converter node 940 is selected. Through the configuration GUI, the user may configure the converter node 940 to convert 3D (x, y, z) accelerometer sensor data received from the fourth port node 220D to a one dimensional 'magnitude' acceleration value (e.g., using the following equation: magnitude=sqrt(x^2+y^2+z^2)). The user may also configure the rules or parameters of the second trigger node 950 via a configuration GUI that is displayed when the second trigger node 950 is selected. Through the configuration GUI, the user may configure the second trigger node 950 to actuate the second port node 220B (execute the actuator function) upon the second trigger node 950 receiving [Inventors—what received value will trigger the actuator here] from the converter node 940. The first 3D virtual environment 200 indicates the direction of data flow between the logic nodes. In particular, the direction of data in the second example flows from the top of the converter node 940 to the bottom of the converter node 940 and then from the top of the second trigger node 950 to the bottom of the second trigger node 950.

Figure 10:
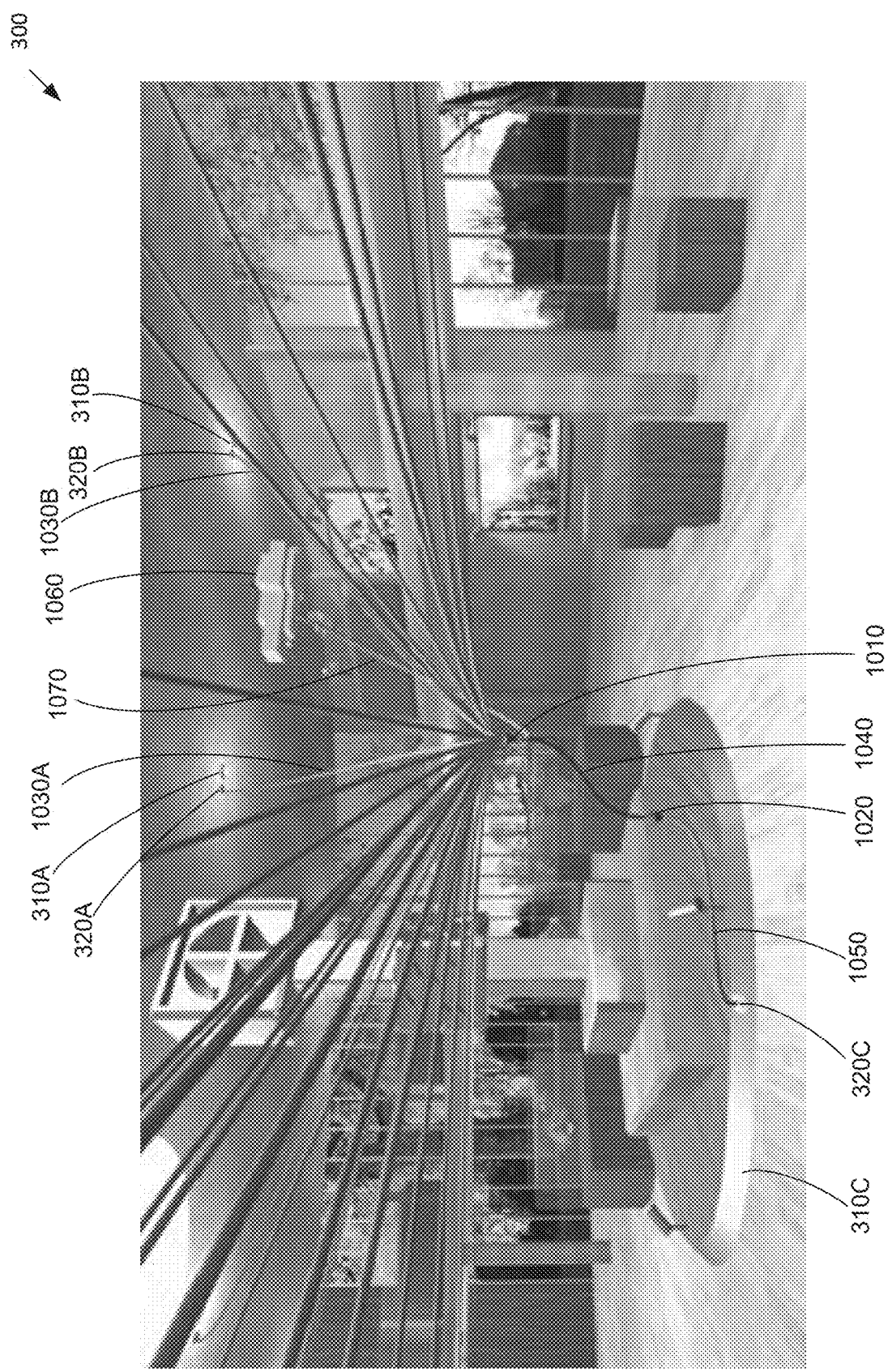
FIG. 10 shows the second 3D virtual environment of FIG. 3 during an authoring stage, according to various embodiments of the present invention.

FIG. 10 shows the second 3D virtual environment 300 of FIG. 3 during an authoring stage, according to various embodiments of the present invention. The second 3D virtual environment 300 visually represents a second real-world environment comprising a museum exhibition room. The second real-world environment includes a plurality of physical objects, including a plurality of foot traffic sensors (including first and second foot traffic sensors) and an exhibit having an embedded actuator. FIG. 10 illustrates an example of a trigger-action pairing for smart objects.

In the example shown in FIG. 10, the user wishes to have the exhibit (represented by the virtual exhibit 310C) automatically turn on when the plurality of foot traffic sensors (represented by a first virtual foot traffic sensor 310A and a second virtual foot traffic sensor 310B) sense an average foot traffic level that exceeds a specified threshold value within the second real-world environment. There are several different ways a foot traffic sensor can detect foot traffic. A simple foot traffic sensor may comprise a passive infrared sensor, which monitors infrared light radiation from objects that pass in front of it, which are commonly found in security/automation systems. Another type of foot traffic sensor may comprise an accelerometer sensor, or implement video cameras running computer vision software.

The first port node 320A represents a foot traffic sensor function of the first foot traffic sensor and first virtual foot traffic sensor 310A, the second port node 329 represents a foot traffic sensor function of the second foot traffic sensor and second virtual foot traffic sensor 310B, and the third port node 320C represents an actuator function of the exhibit and virtual exhibit 310C. The user selects an aggregator node 1010 and places the aggregator node 1010 between the first port node 320A of the first virtual foot traffic sensor 310A and the third port node 320C of the virtual exhibit 310C (e.g., by using the programmer tool 560). The user also selects a trigger node 1020 and places the trigger node 1020 between the aggregator node 1010 and the third port node 320C of the virtual exhibit 310C within the second 3D virtual environment 300 (e.g., by using the programmer tool 560). The user creates a first link 1030A from an output connector of the first port node 320A to the input connector of the aggregator node 1010 (e.g., using the linker tool 520). The user also creates a second link 1030B from an output connector of the second port node 320B to the input connector of the aggregator node 1010. The user may also create links between each port node of each virtual foot traffic sensor to the input connector of the aggregator node 1010. The user also creates a third link 1040 from an output connector of the aggregator node 1010 to the input connector of the trigger node 1020. The user also creates a fourth link 1050 from an output connector of the trigger node 1020 to the input connector of the third port node 320C for the virtual exhibit 310C.

The user may also configure the rules or parameters of the aggregator node 1010 via a configuration GUI that is displayed when the aggregator node 1010 is selected. Through the configuration GUI, the user may configure the aggregator node 1010 to receive a plurality of foot traffic values from the plurality of foot traffic sensors and determine and output an average foot traffic value. The user may also configure the rules or parameters of the trigger node 1020 via a configuration GUI that is displayed when the trigger node 1020 is selected. Through the configuration GUI, the user may configure the trigger node 1020 to actuate the third port node 320C (execute the actuator function) upon the trigger node 1020 receiving (from the aggregator node 1010) an average foot traffic level that exceeds a specified threshold value. The second 3D virtual environment 300 indicates the direction of data flow between the logic nodes. In particular, the direction of data in the example flows from the top of the aggregator node 1010 to the bottom of the aggregator node 1010 and then from the top of the trigger node 1020 to the bottom of the trigger node 1020.

Additionally, the user may wish to store data output from the aggregator node 1010 to an external cloud server for later retrieval and/or inspection. To do so, the user may create a cloud node 1060 to log data output from the aggregator node 1010. To do so, the user selects a cloud node 1060 and places the cloud node 1060 within the second 3D virtual environment 300 (e.g., by using the programmer tool 560). The user then creates a fifth link 1070 from an output connector of aggregator node 1010 to the input connector of the cloud node 1060 (e.g., using the linker tool 520).

As describe above, during an authoring state, the user can author a program comprising a set of logic nodes and a set of link connecting the set of logic nodes. Thus, the authoring of the logic nodes and links produces a program comprising a set of linked logic nodes that represent a set of connected functions. Upon receiving a "run" or "execute" command, the computer system 101 operates in conjunction with the smart objects to execute the program, which implements the set of connected functions within the real-world environment.

The computer system 101 may manage the overall execution of the program by determining the order sequence of execution for the set of logic nodes and controlling the data flow between set of logic nodes based on the set of links. For example, the execution sequence of the logic nodes may input by the user, or may be determined using a stack-based synchronous execution algorithm. When the program is updated (e.g., logic nodes and/or links are created, deleted, or modified), the interface may place all existing logic nodes into a stack. The stack algorithm ensures that each logic node precedes all subsequent logic nodes in an outbound tree of links. Further, the order of link creation by the user may be considered to determine the execution sequence for parallel link chains (when a logic nodes outputs data to multiple logic nodes or when a logic nodes receives input data from multiple logic nodes).

After the order sequence of execution is determined, the computer system 101 may call for execution the logic nodes according to the determined sequence of execution and provide input data and output data to the appropriate logic nodes based on the set of links. For logic nodes that are not port nodes, the logic nodes and the functions represented by the logic nodes are executed by the computer system 101. For each port node representing a set of functions of a corresponding smart object, the computer system 101 may operate in conjunction with the corresponding smart object to execute the port node by executing the set of functions.

As described in relation to FIG. 1, a sensor object 123 may be connected to a sensor server 133 via the network 150, the sensor server 133 also being connected to the computer system 101 via the network 150. Each sensor object 123 may be preconfigured to transmit sensor data to a particular sensor server 133 via the network 150, whereby the sensor server 133 receives and stores the sensor data. When the program executes and the computer system 101 calls a port node representing a sensor function of a sensor object 123, the computer system 101 executes the sensor function by beginning to actively retrieve the sensor data for the sensor object 123 from the sensor server 133 via the network 150. When the program is not executing, the computer system 101 does not actively retrieve the sensor data from the sensor server 133.

As described in relation to FIG. 1, an actuator object 124 may be connected to an actuator server 134 via the network 150, the actuator server 134 also being connected to the computer system 101 via the network 150. Each actuator object 124 may be preconfigured to continually query a web service from a particular actuator server 134 for a actuate command via the network 150. When the program executes and the computer system 101 calls a port node representing an actuator function of an actuator object 124, the computer system 101 executes the actuator function by sending a command (using an HTTP web request) to the particular actuator server 134 via the network, which then relays the command to the actuator 124 via the network causing the actuator 124 to execute its function.

Figure 11:
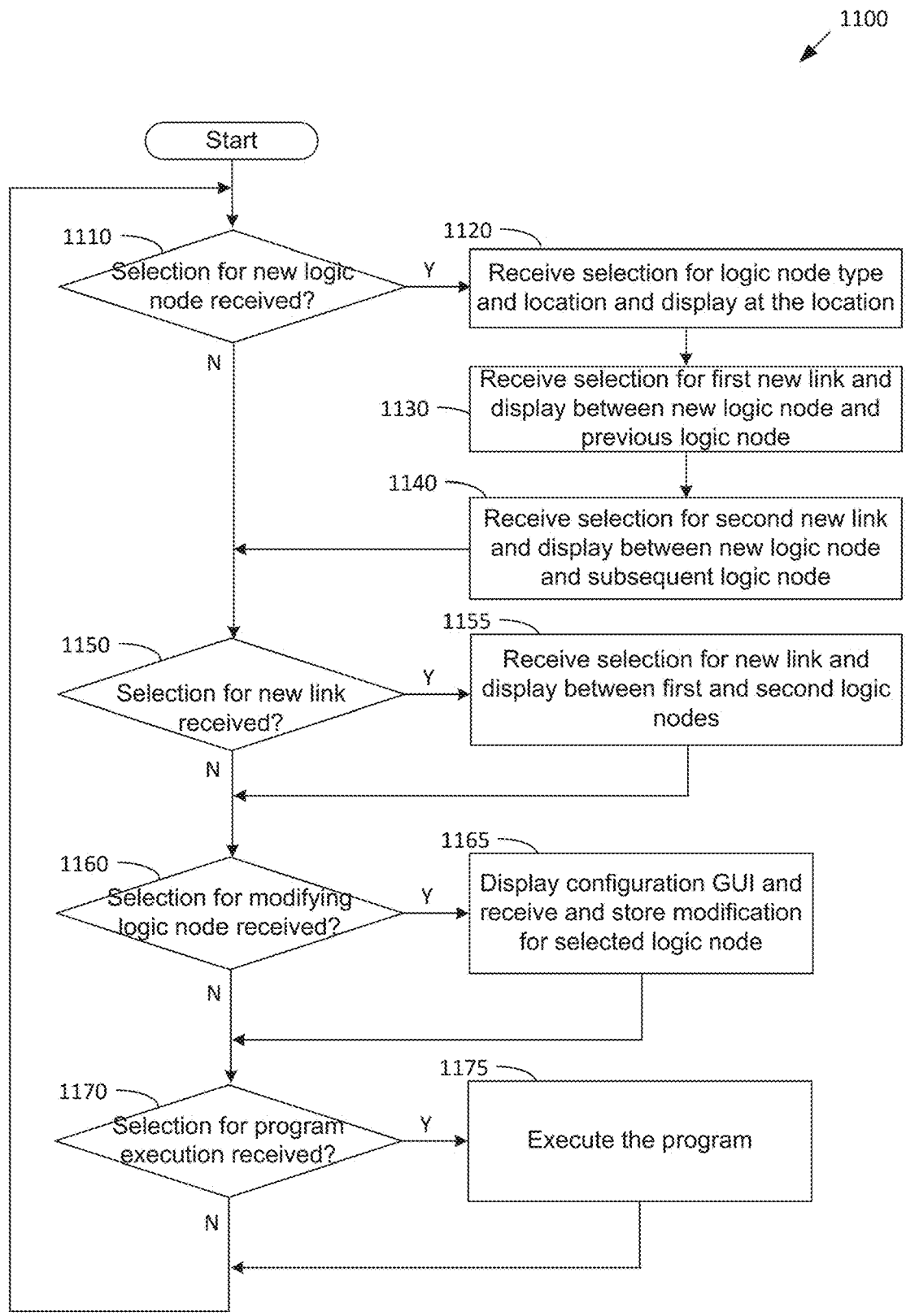
FIG. 11 illustrates a flow diagram of method steps for authoring logic nodes and links in a 3D virtual environment, according to various embodiments of the present invention.

FIG. 11 illustrates a flow diagram of method steps for authoring logic nodes and links in a 3D virtual environment, according to various embodiments of the present invention. Although the method steps are described in conjunction with the systems of FIGS. 1-3 and 5-10, persons skilled in the art will understand that any system configured to perform the method steps, in any order, is within the scope of the present invention. In some embodiments, the method steps are performed by an interface engine 115 executing on a computer system 101 connected to the plurality of physical smart objects (network devices) within a real-world environment. In some steps of the method, the interface engine 115 may receive user inputs and selections via the 3D visual programming interface that displays a 3D virtual environment.

As shown, a method 1100 begins at step 1110, where the interface engine 115, when executed by processing unit 102, determines if a user selection for creating a new logic node is received. If not, the method 1100 continues at step 1150. If so, the interface engine 115 receives (at step 1120) a user selection for a particular type of logic node (e.g., trigger node, filter node, etc.) and a placement location for the new logic node within the 3D virtual environment and displays the new logic node (comprising the selected type of logic node) at the received placement location within the 3D virtual environment. The interface engine 115 may display the new logic node with a visual appearance (color, shape, and size) that corresponds to the selected type of logic node. The interface engine 115 may also display the new logic node with an input connector on the top of the new logic node and an output connector on the bottom of the new logic node which indicates the direction of data flow through the new logic node. At step 1130, the interface engine 115 receives a user selection for a first new link to be created between an input connector on the new logic node and an output connector of a previous logic node and displays the first new link connecting the new logic node and the previous logic node within the 3D virtual environment. At step 1140, the interface engine 115 receives a user selection for a second new link to be created between an output connector on the new logic node and an input connector of a subsequent logic node and displays the second new link connecting the new logic node and the subsequent logic node within the 3D virtual environment. The method 1100 then continues at step 1150.

At step 1150, the interface engine 115 determines if a user selection for creating a new link is received. If not, the method 1100 continues at step 1160. If so, the interface engine 115 receives (at step 1155) a user selection for the new link to be created between an input connector of a first logic node and an output connector of a second logic node and displays the new link connecting the first logic node and the second logic node within the 3D virtual environment. The method 1100 then continues at step 1160.

At step 1160, the interface engine 115 determines if a user selection for modifying a rule or parameter of a logic node is received. If not, the method 1100 continues at step 1170. If so, at step 1165, the interface engine 115 displays a configuration GUI that is specific to the selected logic node and receives and stores a modified rule or parameter for the selected logic node via the configuration GUI.

At step 1170, the interface engine 115 determines if a user selection for executing the program represented in the 3D virtual environment is received, the program comprising a set of linked logic nodes that represent a set of connected functions. If not, the method 1100 continues at step 1110. If so, at step 1175, the interface engine 115 operates in conjunction with the smart objects to execute the program, which implements the set of connected functions within the real-world environment. The method 1100 then ends.

Section IV: Data Flow Visualization

In some embodiments, after the authoring stage and the program is executed, an optional data flow visualization stage may also be implemented. In these embodiments, the interface displays visual/graphical representations of data flows between logic nodes within the 3D virtual environment when the program is executing. The appearance of the visual representations of data flows may be based on attributes of the data flows. The data flow visualization allows users to observe the data flow in real time as the program executes. Thus, data flow visualization allows the user to easily inspect the operation of the program and may assist in debugging the program if necessary. The interface may provide a set if data flow viewing tools/functions accessible through the inspector tool 570. The viewing tools control how the data flow is viewed and may assist the user in both program inspection and debugging efforts. The set of viewing tools may include a run tool, pause tool, step tool, sequence tool, and an In/Out links tool.

When the run tool/function is selected, the program executes and data flows between the logic nodes may be visually represented as particles or particle clouds moving along the links between the logic nodes. The interface may display these particles with different colors, size, and volume based on attributes of the data flows. In particular, for a first link between two logic nodes, the interface may display particles moving along the first link with particular color, size, and volume based on attributes of the data flow through the first link between two logic nodes.

Figure 12:
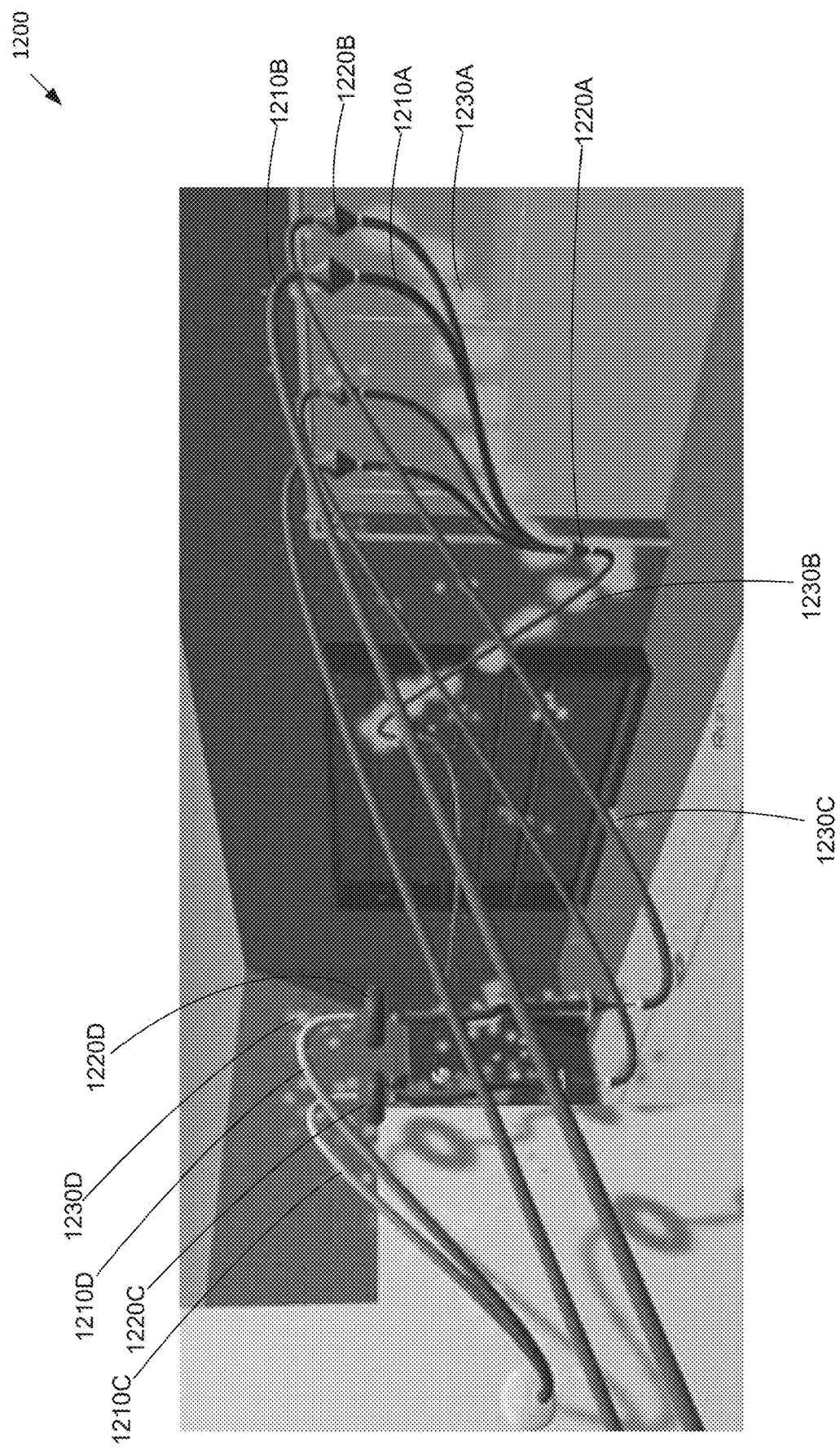
FIG. 12 shows an exemplary screenshot of the 3D visual programming interface showing a viewing tool comprising a run tool during execution, according to various embodiments of the present invention.

FIG. 12 shows an exemplary screenshot 1200 of the interface showing execution of a viewing tool comprising a run tool, according to various embodiments of the present invention. As shown, the interface displays visually representation of data flows along various links 1210 (such as 1210A, 1210B, 1210C, etc.) between various logic nodes 1220 (such as 1220A, 1220B, 1220C, etc.) as particles or particle clouds 1230 (such as 1230A, 1230B, 1230C, etc.) moving along the various links 1210 between the various logic nodes 1220. The interface may display these particles 1230 with different colors, size, and volume based on attributes of the data flows which allows the user to easily understand the attributes of the data flows.

The moving particles 1230 may visually represent the data being transmitted along a link between logic nodes. The interface engine 115 may collect the data transmitted between the logic nodes and store the data (e.g., to database 114) for further processing. The interface engine 115 then maps particular attributes of the collected data to particular visual attributes of the particles. The mapping may be performed using a manually-coded lookup table that maps particular attributes of data to particular visual attributes.

In some embodiments, the interface engine 115 maps different types of sensor data to different colors for the particles. For example, temperature sensor data may be mapped to a first color (e.g., red), light sensor data may be mapped to a second color (e.g., yellow), motion sensor data may be mapped to a third color (e.g., blue), acceleration sensor data may be mapped to a fourth color (e.g., green), and so forth. The interface engine 115 may determine the type of sensor data from the object metadata associated with the sensor object that is transmitting the sensor data. Thus, the color of a particle may indicate the type of sensor that is the original source of the data flow and allows users to trace each source's path through the program structure.

The interface engine 115 may also map different values of the data to different sizes for the particles. The size of particle may indicate a relative value of the corresponding data, whereby larger particles indicate greater values and larger particles indicate smaller values. Data values may be scaled linearly based on a low and high value pair determined for each source sensor type, such that the lowest and highest data values map to minimum and maximum particle sizes (in pixels), respectively. For example, the interface engine 115 may monitor the range of data values as the program executes and maintain a minimum and maximum value of the data. To determine the size (in pixels) of the rendered particle, the interface engine 115 may determine a current data value, divides the current data value by the observed minimum and maximum, and multiply the result by the maximum desired particle size (in pixels). Vector3 data values may be mapped using the vector's magnitude, and Boolean values may be mapped to either zero or the high value of the given sensor source.

The interface engine 115 may also map different frequencies of the data to different volumes for the particles. Thus, sensor data that updates data values frequently may be represented by particles having greater volume flowing through a link than sensor data that updates data values less frequently. For example, the interface engine 115 may determine a maximum data frequency, which is then mapped linearly to a maximum particle volume.

When the pause tool/function is selected, the interface engine 115 may freeze/pause the movement of the particles at the point in time the user selection of pause tool. The interface engine 115 may further pause execution of the program at the point in time the user selection of pause tool, whereby a currently executing logic node does not call any subsequent logic nodes for execution and any new sensor data generated by sensors is buffered to memory and not acted upon until the user resumes program execution (by selecting the run tool). Thus, the pause tool allows the user to halt program execution at its current state and the interface engine 115 displays a snapshot of data flows occurring in the 3D virtual environment when the user selected the pause tool. The pause tool may assist the user in program inspection and debugging.

The step tool allows the user to step through the various stages of program execution from one logic node to a subsequent logic node, and so forth. For example, when the step tool is selected, the interface engine 115 may step the program execution to a logic node and pause the program execution until the step tool is selected again. When the step tool is selected again, the interface engine 115 may then step the program execution to a subsequent logic node and pause the program execution until the step tool is selected again, and so forth. At each pausing of the program execution, the interface engine 115 may freeze/pause the movement of the particles (similar to the pause tool), but also allows the user to incrementally execute the program by selecting the step tool again. Thus, the step tool provides control over program execution to the user, allowing them to step through program stages at their own pace. Each selection of the step tool passes execution to the next logic node to be executed. The interface engine 115 may visually highlight the current logic node being executed and also visually highlight all active links connected to the current logic node.

The sequence tool perform functions similar to the step tool described above, except that the particles representing data flow are displayed with a slowed down motion to give a visual effect of the data flowing slowly through the program. The sequence tool may allow users to better understand the flow of the data in the program. The sequence tool may also delay changes in the visualization of data values, so that instead of the particle size being updated immediately based on the data values, updates are delayed until all previous particles have fully traversed their respective links. In addition, updates to data values may only effect newly emitted particles. As such, each link may contain varying particle sizes, and users can better track changes in data values over time.

When the In/Out links tool is selected for a particular logic node, the interface engine 115 may visually highlight the selected logic node and also visually highlight all links connected to the selected logic node. The In/Out links tool allows users to easily identify all links connected to a logic node. The In/Out links tool may also users to selectively highlight a logic node's inbound links, outbound links, or all connected links. The interface engine 115 may also visually shrink all other links (not connected to the selected logic node) in diameter to reduce occlusion.

Figure 13:
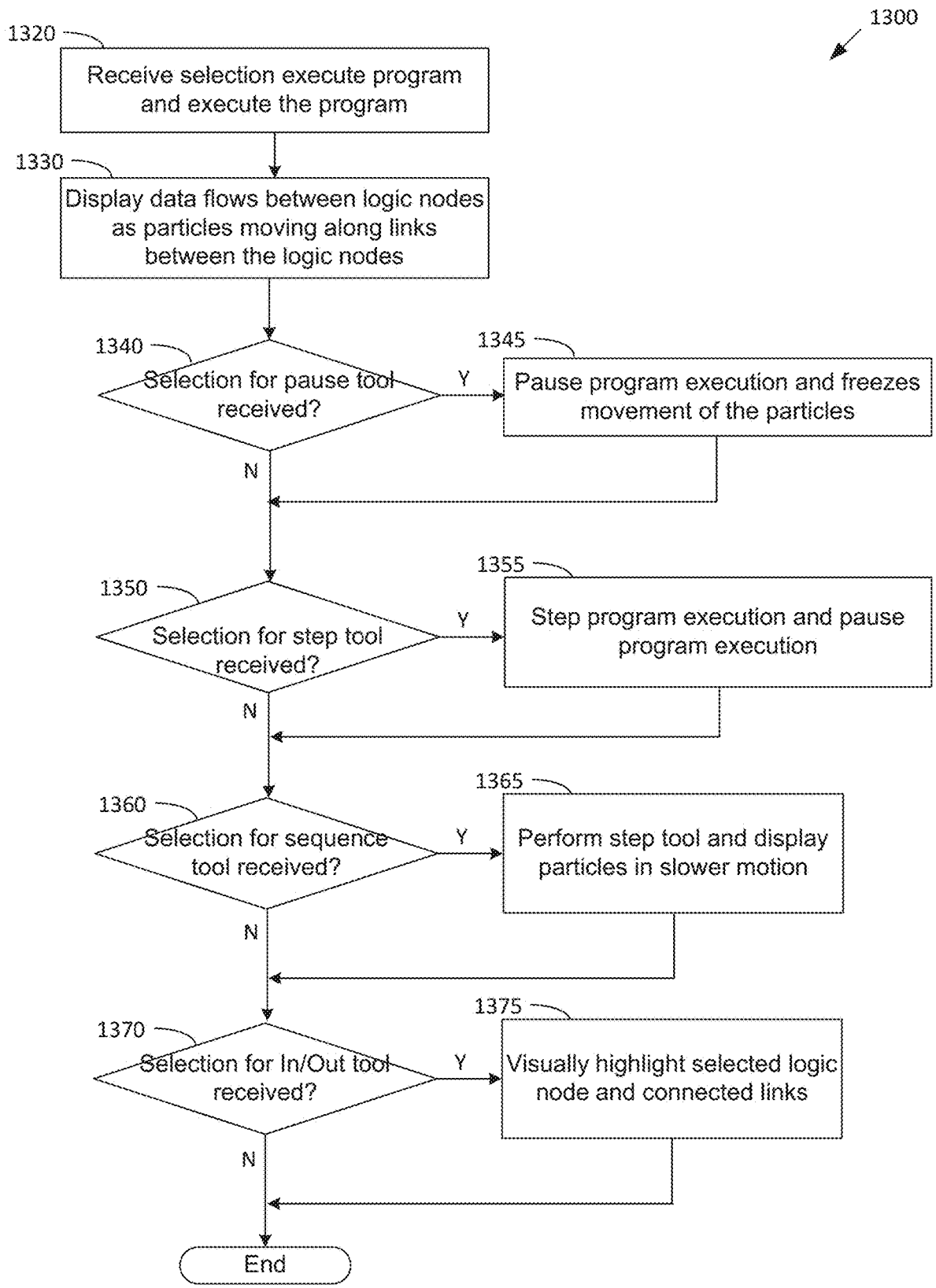
FIG. 13 illustrates a flow diagram of method steps for viewing a data flow in a 3D virtual environment, according to various embodiments of the present invention.

FIG. 13 illustrates a flow diagram of method steps for viewing data flow in a 3D virtual environment, according to various embodiments of the present invention. Although the method steps are described in conjunction with the systems of FIGS. 1-3, 5-10, and 12, persons skilled in the art will understand that any system configured to perform the method steps, in any order, is within the scope of the present invention. In some embodiments, the method steps are performed by an interface engine 115 executing on a computer system 101 connected to the plurality of physical smart objects (network devices) within a real-world environment. In some steps of the method, the interface engine 115 may receive user inputs and selections via the 3D visual programming interface that displays a 3D virtual environment.

As shown, a method 1300 begins at step 1320, where the interface engine 115, when executed by processing unit 102, receives a user selection for a run tool to execute a program represented in the 3D virtual environment and in response, the interface engine 115 operates in conjunction with the smart objects to execute the program. At step 1330, the interface engine 115 displays visual representations of data flows between the logic nodes comprising particles or particle clouds moving along the links between the logic nodes. The interface engine 115 may display the particles with different colors, size, and volume based on attributes of the data flows. In particular, for a first link between two logic nodes, the interface may display particles moving along the first link with particular color, size, and volume based on attributes of the data flow through the first link between two logic nodes. For example, the interface engine 115 may map different types of sensor data to different colors for the particles, map different values of the data to different sizes (in pixels) for the particles, and/or map different frequencies of the data to different volumes for the particles.

At step 1340, the interface engine 115 determines if a user selection for a pause tool is received. If not, the method 1300 continues at step 1350. If so, at step 1345, the interface engine 115 pauses execution of the program and freezes the movement of the particles within the 3D virtual environment.

At step 1350, the interface engine 115 determines if a user selection for a step tool is received. If not, the method 1300 continues at step 1360. If so, at step 1355, the interface engine 115 steps the program execution to a logic node and pauses the program execution until the step tool is selected again, and the steps the program execution to a subsequent logic node, and so forth. At each pausing of the program execution, the interface engine 115 may freeze/pause the movement of the particles within the 3D virtual environment.

At step 1360, the interface engine 115 determines if a user selection for a sequence tool is received. If not, the method 1300 continues at step 1370. If so, at step 1365, the interface engine 115 performs functions similar to the step tool described above, except that the particles representing data flow are displayed with a slowed down motion.

At step 1370, the interface engine 115 determines if a user selection for an In/Out links tool is received for a particular logic node. If not, the method 1300 ends. If so, at step 1375, the interface engine 115 visually highlights the selected logic node and links connected to the selected logic node.

In sum, embodiments of the invention are directed towards techniques for generating virtual representations of network devices/smart objects in a 3D visual programming interface (which may be referred to herein as an "interface"). The interface is executed on a computer system that is connected with a plurality of smart objects via a network. As described in Section II, the interface may display a 3D virtual environment containing multiple virtual objects that represents a real-world environment (such as a room, building, factory, etc.) containing multiple smart objects. Each smart object comprises a network device that is configured to perform a set of one or more functions, such as a sensor function or an actuator function. The 3D virtual environment displays virtual objects in a manner that is spatially accurate relative to the physical objects in the real-world environment. For each virtual object representing a particular physical object, a logic node (port node) is generated and displayed for the virtual object, the port node representing the set of functions associated with the particular physical object. As described in Section III, the interface enables users to create, delete, or modify different types of logic nodes (representing different types of functions) and create, delete, or modify links (representing data paths/connections) between logic nodes within the 3D virtual environment. The authoring of the logic nodes and links produces a program comprising a set of interlinked logic nodes that represent a set of interlinked functions. Upon receiving a "run" command, the computer system operates in conjunction with the smart objects to execute the program which implements the set of interlinked functions within the real-world environment. As described in Section IV, the interface displays visual representations of data flows between logic nodes within the 3D virtual environment when the program is executing. The data flows between the logic nodes are visually represented as particles moving between the logic nodes. The particles may be displayed with different colors, size, and volume based on attributes of the data flows. Data flow visualization allows the user to easily inspect the operation of the program and assist in debugging the program if necessary.

At least one advantage of the disclosed technique is that the 3D visual programming interface displays a 3D virtual environment that enables users to easily program and understand the logical functions and the data connections between the logical functions that operate within a network of physical objects. Another advantage of the disclosed technique is that 3D virtual environment displays virtual objects having the spatial relationship and scale of the physical objects in the real-world environment. Thus, a virtual object that corresponds to a particular physical object may be easily identified by a user for programming and/or viewing the virtual object and corresponding physical object. Another advantage of the disclosed technique is that the 3D visual programming interface allows users to easily create a program comprising logic nodes (representing different types of functions) and links between the logic nodes (representing data connections between functions) within the 3D virtual environment. A further advantage of the disclosed technique is that upon executing the program, the 3D visual programming interface displays visual representations of data flows between logic nodes within the 3D virtual environment. Data flow visualization allows the user to easily inspect the operation of the program and assist in debugging the program if necessary.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," or "engine." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method, comprising:
   displaying a three-dimensional virtual environment that includes a first logic node connected to a second logic node via a first link, wherein:
      the first logic node, the second logic node, and the first link comprise an executable program,
      the first logic node represents a set of functions performed by a first physical object,
      the second logic node represents a set of functions performed by a second physical object, and
      the first link graphically represents a first data connection between the first logic node and the second logic node;
   executing the executable program on one or more processors to begin execution of the first logic node and cause a data flow between the first logic node and the second logic node via the first data connection;
   displaying a plurality of particles moving along the first link with a first motion to visually represent the data flow;
   in response to receiving a selection of a step tool while the first logic node is executing, performing the steps of:
      completing execution of the first logic node; and
      upon the completion of execution of the first logic node, pausing execution of the executable program and stopping the plurality of particles from moving along the first link; and
   in response to receiving a selection of a sequence tool, performing the steps of:
      executing the executable program to begin execution of the second logic node; and
      displaying the plurality of particles moving along the first link with a second motion that appears slower than the first motion.

2. The computer-implemented method of claim 1, wherein the visual appearance of the plurality of particles is based on one or more attributes of data included in the data flow.

3. The computer-implemented method of claim 1, wherein a color of the plurality of particles is based on a type of data included in the data flow.

4. The computer-implemented method of claim 1, wherein a size of the plurality of particles is based on values of data included in the data flow.

5. The computer-implemented method of claim 1, wherein a volume of the plurality of particles is based on a frequency associated with data included in the data flow.

6. The computer-implemented method of claim 1, further comprising receiving a selection of a pause tool, and freezing the plurality of particles and stopping the plurality of particles from moving between the first logic node and the second logic node along the first link.

7. The computer-implemented method of claim 6, further comprising pausing execution of the executable program on the one or more processors.

8. One or more non-transitory computer-readable media storing program instructions that, when executed by one or more processors, cause the one or more processors to perform the steps of:
displaying a three-dimensional virtual environment that includes a first logic node connected to a second logic node via a first link, wherein:
the first logic node, the second logic node, and the first link comprise an executable program,
the first logic node represents a set of functions performed by a first physical object,
the second logic node represents a set of functions performed by a second physical object, and
the first link graphically represents a first data connection between the first logic node and the second logic node;
executing the executable program on one or more processors to begin execution of the first logic node and cause a data flow between the first logic node and the second logic node via the first data connection;
displaying a plurality of particles moving along the first link with a first motion to visually represent the data flow;
in response to receiving a selection of a step tool while the first logic node is executing, performing the steps of:
completing execution of the first logic node; and
upon the completion of execution of the first logic node, pausing execution of the executable program and stopping the plurality of particles from moving along the first link; and
in response to receiving a selection of a sequence tool, performing the steps of:
executing the executable program to begin execution of the second logic node; and
displaying the plurality of particles moving along the first link with a second motion that appears slower than the first motion.

9. The one or more non-transitory computer-readable media of claim 8, wherein at least one of a color, a size, or a volume of the plurality of particles is based on one or more attributes of data included in the data flow.

10. The one or more non-transitory computer-readable media of claim 8, wherein a color of the plurality of particles is based on a type of data included in the data flow.

11. The one or more non-transitory computer-readable media of claim 8, wherein the first physical object comprises a sensor object, and a color of the plurality of particles is based on a sensor type associated with the sensor object.

12. The one or more non-transitory computer-readable media of claim 8, wherein a size of the plurality of particles is based on values of data included in the data flow.

13. The one or more non-transitory computer-readable media of claim 8, wherein a volume of the plurality of particles is based on a frequency associated with data included in the data flow.

14. The one or more non-transitory computer-readable media of claim 8, further comprising receiving a selection of a pause tool, and stopping the plurality of particles from moving between the first logic node and the second logic node along the first link.

15. A system, comprising:
a memory that includes an interface engine; and
a processor that is coupled to the memory and, when executing the interface engine, performs the steps of:
displaying a three-dimensional virtual environment that includes a first logic node connected to a second logic node via a first link,
wherein:
the first logic node, the second logic node, and the first link comprise an executable program,
the first logic node represents a set of functions performed by a first physical object,
the second logic node represents a set of functions performed by a second physical object, and
the first link graphically represents a first data connection between the first logic node and the second logic node;
executing the executable program to begin execution of the first logic node and cause a data flow between the first logic node and the second logic node via the first data connection;
displaying a plurality of particles moving along the first link with a first motion to visually represent the data flow;
in response to receiving a selection of a step tool while the first logic node is executing, performing the steps of:
completing execution of the first logic node; and
upon the completion of execution of the first logic node, pausing execution of the executable program and stopping the plurality of particles from moving along the first link; and
in response to receiving a selection of a sequence tool, performing the steps of:
executing the executable program to begin execution of the second logic node; and
displaying the plurality of particles moving along the first link with a second motion that appears slower than the first motion.

* * * * *

UNITED STATES PATENT AND TRADEMARK OFFICE
CERTIFICATE OF CORRECTION

PATENT NO. : 11,809,678 B2
APPLICATION NO. : 15/717876
DATED : November 7, 2023
INVENTOR(S) : Barrett Ens et al.

Page 1 of 1

It is certified that error appears in the above-identified patent and that said Letters Patent is hereby corrected as shown below:

On the Title Page

(56) References Cited:

Please insert --2010/0100851 A1 4/2010 Clark et al.--;

Please insert --Hiroaki Nishino et al., "A Virtual Environment for Modeling 3D Objects Through Spatial Interaction", IEEE, 1999, 6 pages.--;

Please insert --Final Office Action issued for U.S. Appl. No. 15/636,517 dated Feb. 16, 2021, 27 pages.--;

Please delete "1 Final Office Action received for U.S. Appl. No. 15/636,517 dated May 5, 2022, 40 pages." and insert --Final Office Action received for U.S. Appl. No. 15/636,517 dated May 5, 2022, 40 pages.--.

Signed and Sealed this
Twenty-third Day of January, 2024

Katherine Kelly Vidal
*Director of the United States Patent and Trademark Office*